United States Patent [19]

Hayashi

[11] Patent Number: 5,451,762

[45] Date of Patent: Sep. 19, 1995

[54] OPTICAL CARD HAVING GUIDE PATTERNS FOR INFORMATION LINE POSITIONING AND OPTICAL CARD RECORDING/REPRODUCING APPARATUS

[75] Inventor: Yasuo Hayashi, Hachioji, Japan

[73] Assignee: Olympus Optical Co., Ltd., Tokyo, Japan

[21] Appl. No.: 302,980

[22] Filed: Sep. 12, 1994

Related U.S. Application Data

[63] Continuation of Ser. No. 903,460, Jun. 24, 1992, abandoned.

[30] Foreign Application Priority Data

Jun. 26, 1991 [JP] Japan ................. 3-154651
Nov. 5, 1991 [JP] Japan ................. 3-288898

[51] Int. Cl.$^6$ ............................................. G06K 7/10
[52] U.S. Cl. ................................. 235/487; 235/454; 235/494; 369/44.26; 369/275.3
[58] Field of Search ............... 235/454, 487, 491, 493, 235/494; 369/44.28, 13, 32, 14, 15, 44.26, 275.3

[56] References Cited

U.S. PATENT DOCUMENTS

| | | | |
|---|---|---|---|
| 4,885,458 | 12/1989 | Horiguchi et al. | 235/454 |
| 4,979,159 | 12/1990 | Tsuruoka et al. | 235/494 X |
| 4,983,819 | 1/1991 | Hashimoto | 235/488 |
| 5,008,552 | 4/1991 | Kuramochi et al. | 235/483 |
| 5,132,522 | 7/1992 | Oshiba | 235/454 |
| 5,157,249 | 10/1992 | Hashimoto et al. | 369/44.25 X |

FOREIGN PATENT DOCUMENTS

| | | |
|---|---|---|
| 62-279523 | 12/1987 | Japan . |
| 63-153727 | 6/1988 | Japan . |
| 63-145669 | 9/1988 | Japan . |
| 056579 | 6/1991 | Japan . |

*Primary Examiner*—Donald Hajec
*Assistant Examiner*—Michael G. Lee
*Attorney, Agent, or Firm*—Armstrong, Westerman, Hattori, McLeland & Naughton

[57] ABSTRACT

A guide pattern used to position a light spot on a desired information line is formed in each track formed of a plurality of information lines. Light reflected from this guide pattern is converted into electrical signals by a photodetector, and a signal indicating a positional deviation from each information line is generated. A mirror is driven by a piezoelectric element, and a recording light beam is irradiated onto one of the information lines. Information lines traversed are counted on the basis of the positional deviation signal outputted when the information lines are traversed. Positioning on the desired information line is performed on the basis of the counted value.

13 Claims, 18 Drawing Sheets

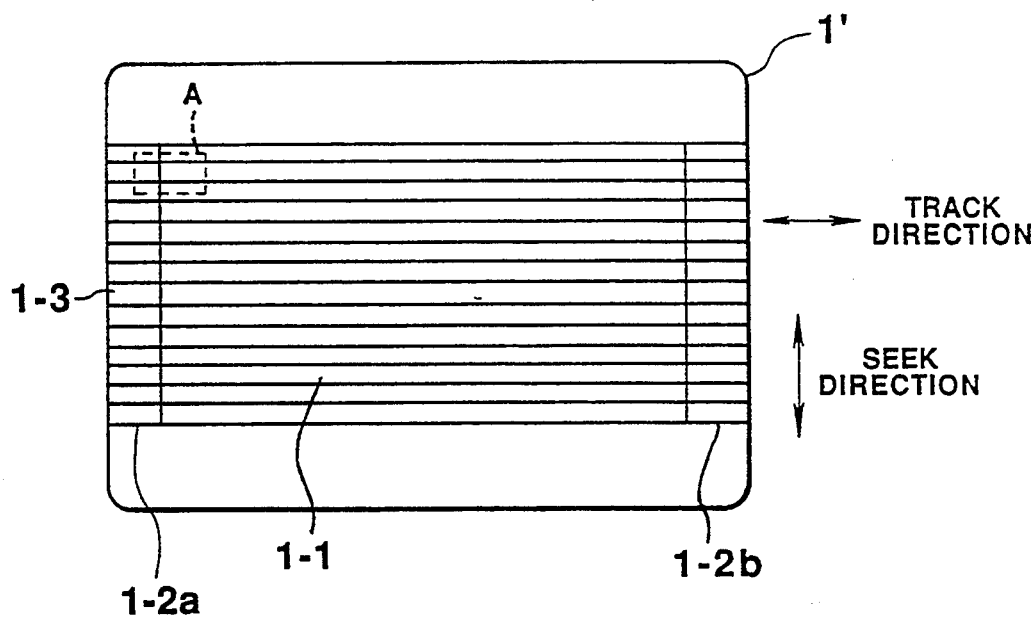
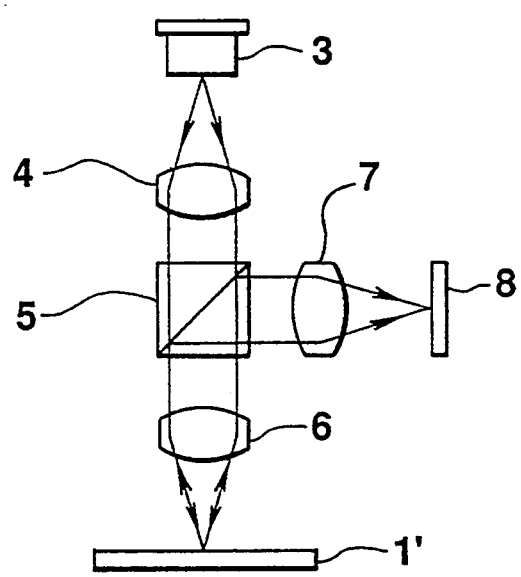

FIG. 20
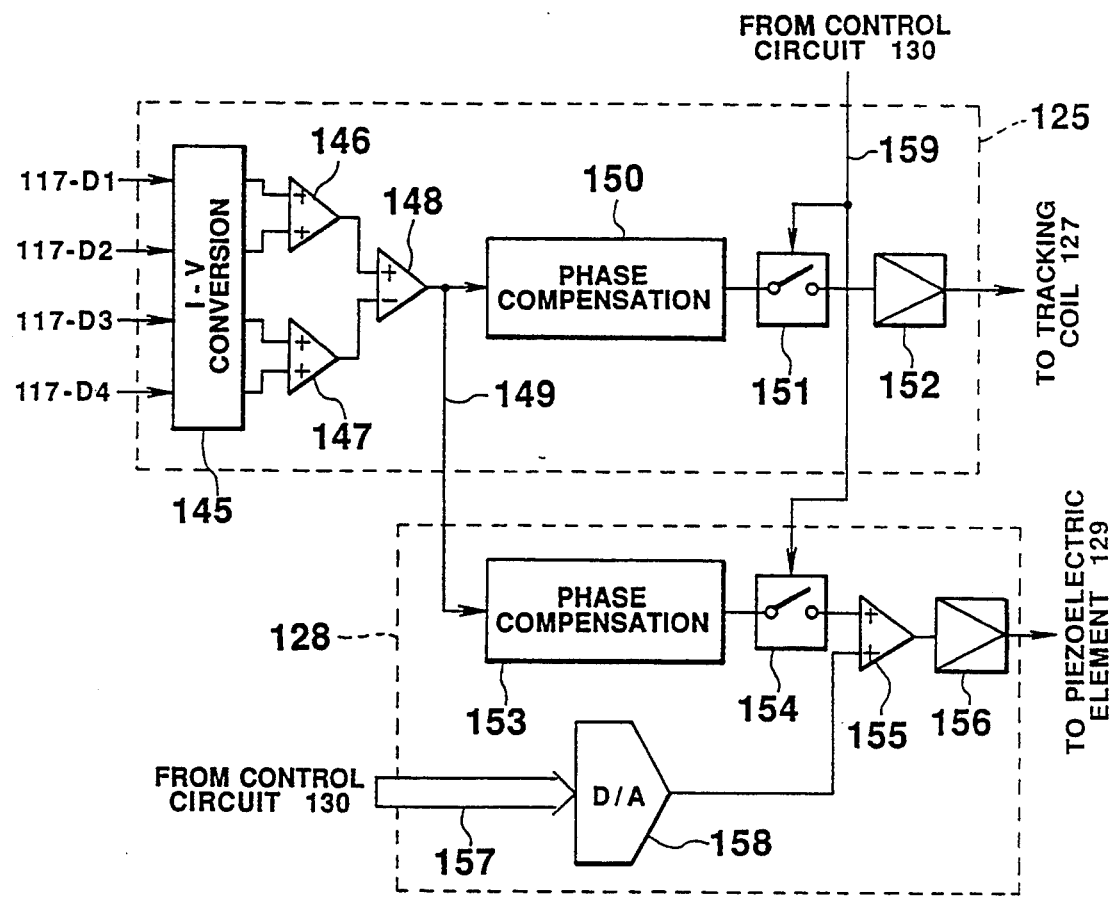
FIG. 22(a)
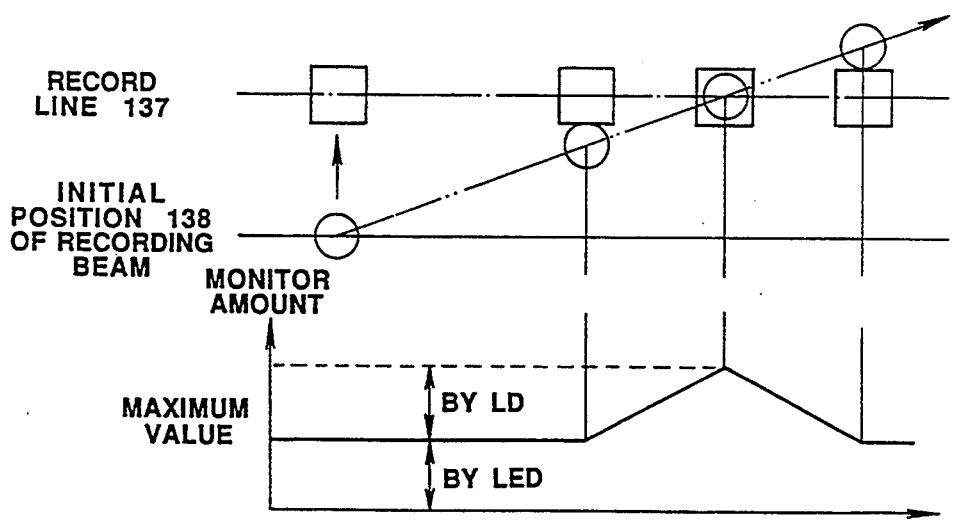
FIG. 22(b)

OPTICAL CARD HAVING GUIDE PATTERNS FOR INFORMATION LINE POSITIONING AND OPTICAL CARD RECORDING/REPRODUCING APPARATUS

This application is a continuation of application Ser. No. 07/903,460 filed Jun. 24, 1992, now abandoned.

BACKGROUND OF THE INVENTION

1. Field of the Invention

The present invention relates to an optical card having guide patterns used to position a light beam to a target line of a plurality of information lines which form tracks and an optical card recording/reproducing apparatus for recording information to and/or reproducing information from the optical card.

In recent years, an optical card recording/reproducing apparatus which is capable of optically performing a recording and reproduction operation by irradiating a light beam instead of using a magnetic head have come to be widely used. For optical recording mediums used in such optical card recording/reproducing apparatus, recording mediums in the form of disks (hereinafter referred to as optical disks) and cards (hereinafter referred to as optical cards) are commonly used.

An optical card has the same size and shape as a credit card, and can be carried easily. It features a large storage capacity and low cost optical cards are expected to be information recording carriers of the next generation, and various types have been proposed.

Referring to the accompanying drawings, the prior art will now be explained. An optical card 1' shown in FIG. 1 is disclosed, for example, in Japanese utility Model Publication No. 63-145669.

In such optical card 1', information is recorded as high or low reflectance (sometimes the high portion is represented in white and the low portion is in black), and optically reproduced. This information is recorded and/or reproduced in a unit called a track 1-3. A plurality of tracks 1-3 in bands or lines are arranged parallel to one another, and thus forming one card.

In the prior art shown in FIG. 1, ID areas 1-2a and 1-2b in which track Nos. for identifying the tracks are written, are placed at both ends of the tracks 1-3. In the remaining portions, data area 1-1 to which data is previously recorded or recorded additionally is formed.

Specific recognition patterns common to all tracks are prerecorded in the ID areas 1-2a and 1-2b in addition to the track numbers in order for a track number to be recognized, making it easy to seek a target track.

FIG. 2 shows in detail the tracks in area A of FIG. 1 surrounded by the dotted line. In the tracks 1-3, clock patterns 1-5 are prerecorded. The clock patterns 1-5 which extend parallel to the tracks, having a high and a low reflectance, are prerecorded in clock line area 1-4 in the central portion in the direction of the track width and are used to generate a tracking error signal and a focus error signal.

In the data area 1-1, 16 information lines are formed so that data of 8 bits can be recorded in the direction of the track width, at both sides of the clock line area 1-4 in the center (a total of 16 bits can be recorded).

The clock patterns 1-5 formed in the clock line area 1-4 in the center serve as guides used to detect that the central position of a track has been detected (used to generate a tracking error signal). White and black patterns are formed so that clocks, which become synchronization signals when pits recorded in each information line of the data area 1-1 are reproduced, can be generated.

In ID area 1-2a, reference numerals 1-6a to 1-6h denote specific recognition patterns common to the tracks, and reference numerals 1-71 to 1-78 denote patterns indicating track numbers. A track number 1-7 and a recognition pattern 1-6 in the ID area 1-2a are detected during the seek operation. Data of 16 bits long in data area 1-1a is read at one time during the recording and/or reproduction operation. Thus, the speed of the reading operation is increased.

FIG. 3 shows an arrangement similar to the optical pickup disclosed in Japanese Patent Laid-Open No. 63-153727. Light beams from a light source 3 (e.g., an led) are formed into substantially parallel light beams by a collimator lens 4. The light beams transmitted through a half prism 5 are condensed by an object lens 6, and projected onto the recording surface of the optical card 1.

As a result, a light spot illuminating an area wide enough to cover one track is formed. The reflected light beams thereof are condensed by the object lens 6, reflected by the half prism 5, are made to pass through an image forming lens 7, and received by a photodetector 8.

FIG. 4 shows the photoreceptive surface of the photodetector 8.

The image on tracks 1-3 shown in FIG. 2 is projected onto the photoreceptive surface of the photodetector 8 so as to cover one track, and a detection signal is output.

The photodetector 8 comprises 16 photoreceptive areas 8-A1 to 8-A16 for reading data disposed in correspondence with data recording positions for 16 bits in the direction of the track width, five pairs of photoreceptive areas 8-B1 to B10 for generating clocks, disposed spaced apart in the track direction so as to receive the image of the clock pattern 1-5, and four pairs of photoreceptive areas 8-C1 to 8-C4 and 8-D1 to 8-D4 for detecting servo signals, disposed spaced apart in the track direction so as to receive the image of both edge portions of the clock pattern 1-5 in the track direction.

In the photodetector of FIG. 4, a focus error signal (FE) is obtained on the basis of the sum of the outputs of the photoreceptive areas 8-C1 to 8-C4 for detecting servo signals on the outside, and the outputs of the photoreceptive areas 8-D1 to 8-D4, for detecting servo signals on the inside. A tracking error signal (TE) is obtained on the basis of the difference between the sum of the outputs of the photoreceptive areas 8-D1 and 8-D3, for detecting servo signals, and the sum of the outputs of the photoreceptive areas 8-D2 and 8-D4, for detecting servo signals.

A clock signal is obtained on the basis of the difference between the sum of the outputs of the photoreceptive areas 8-B1, 8-B3, 8-B5, 8-B7 and 8-B9, each of which forms one half of the pair of areas for generating clocks, and the sum of the outputs of the photoreceptive areas 8-B2, 8-B4, 8-B6, 8-B8 and 8-B10, each of which forms the other of the pair. In synchronization with this clock signal, 16 bits of data are read at one time on the basis of the outputs of the photoreceptive areas 8-A1 to 8-A16.

FIG. 5 shows a tracking error signal (TE) when an optical pickup is moved in a forward/backward direction, and a specific recognition pattern matching signal common to each track, in the seek direction (in the direction of the track width) in a condition where the tracking servo system is open. The track number is input on the basis of the zero cross signal of the track error signal plus the recognition pattern matching signal to determine whether the target track is detected.

However, when recording information by using an optical card format of the prior art, a track number during the seek operation is input when the zero cross signal of the track error signal matches a recognition pattern common to each track and a target track is detected. Therefore, when a recording beam is projected onto a desired information line within 16 lines of a data area in one track and information is recorded, even though positioning among tracks is easy, positioning to a desired information line in the direction of the track width within the track is difficult.

In the example in FIG. 5, although a recognition pattern matching signal is output at the central positions of tracks N and N-1, the matching signal output becomes indefinite because of a combination of patterns indicating track numbers among tracks.

That is, positioning for each track in a clock pattern position in the center of each track is easy, but positioning on a information line is difficult. Since a reproducing apparatus used exclusively for reproducing efficiently the information recorded on an optical card is used in the prior art, this degree of positioning accuracy is sufficient for an optical card recorded by such a format. However, to record information, a desired information line must be accessed, and positioning at an arbitrary information line within a track is required.

As shown in FIG. 5, when the information line is traversed at a position other than a clock pattern position, in the center of each track, a signal similar to the tracking error signal is output.

This signal cannot be used for positioning on a desired information line because the signal changes in response to the pattern of the track recognition number (this number is common to all tracks) and the track number.

In Japanese Patent Laid-Open No. 63-153727, one semiconductor laser is used as a recording light source, information is written on a plurality of information lines within one track of the optical card by scanning a recording beam from the semiconductor laser in the direction of the track width by causing a mirror to be rotated by a bimorph or the like. Thus, the recording density of one track is increased.

In Japanese Patent Laid-Open No. 62-279523, a recording beam is deflected by causing a recording element itself (a semiconductor laser) to move in the direction of the track width so that information is written on a plurality of information lines of one track.

In the above-described two examples of the prior art, reliable positioning on an information line is difficult. In other words, positioning of a recording beam reference is performed on the basis of the light reflected from a clock pattern position, in the center of the track, and a mirror is rotated from this reference position according to the information line. Thus, positioning to the information line is performed. In this case, the function for reliably positioning on an information line is fairly inaccurate and an erroneous irradiation of light beams to a neighboring information line may occur since whether or not light beams are reliably set on a target information line cannot be detected or determined because positioning is not performed by directly receiving light reflected from the information line portion.

SUMMARY OF THE INVENTION

An object of the present invention is to provide an optical card recording/reproducing apparatus which is capable of reliably positioning a recording beam to a desired information line within a track of an optical card.

Another object of the present invention is to provide a low-cost optical card recording/reproducing apparatus which is capable of efficiently recording information to a desired information line within a track of an optical card and which is small and light in weight.

The optical card of the present invention comprises tracks having a plurality of information lines, the tracks being formed parallel to each other; and an ID area in which ID information for identifying each track is recorded, a data area, formed in a portion other than the ID area, for optically recording data, and a guide pattern portion formed adjacent to the ID area, in which guide information for positioning on any one of the plurality of information lines is formed.

The optical card recording/reproducing apparatus of the present invention comprises:

illumination light irradiation means for irradiating illumination light to the optical card over a wide area so as to cover the entire area of at least one track width;

optical detection means for receiving light reflected from the optical card onto which the illumination light has been irradiated and for photoelectrically converting the light;

focus control means for controlling a relative distance between the optical card and the illumination light irradiation means on the basis of the output of the optical detection means so that the relative distance is brought into a focus state;

first positioning means for performing relative positioning of an illumination light spot irradiated onto the optical card and formed in the direction of the track width in units of tracks, on the basis of the output of the optical detection means; recording beam generating means for generating recording light beams;

and second positioning means for positioning said light beams for recording on a desired information line among the information lines on the basis of the output of the optical detection means which receives light reflected from the guide pattern.

The optical card recording/reproducing apparatus is designed to perform positioning to a desired information line.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a view illustrating the construction of an optical card of the prior art;

FIG. 3 is a view schematically illustrating the construction of an optical card recording/reproducing apparatus of the prior art;

FIGS. 6 to 13 are views related to an embodiment of the present invention;

FIG. 7 is a format view illustrating in detail the structure of the portion indicated by a reference letter A in FIG. 6;

FIG. 8 is a block diagram illustrating the entire construction of an optical card recording/reproducing apparatus for recording/reproducing information to/-from the optical card of FIG. 6;

FIG. 9 is a view illustrating the construction of a tracking control circuit and a mirror control control circuit according to the embodiment;

FIG. 10 is a timing chart illustrating ate signal when an optical card is sought in a forward/backward direction on a guide pattern portion in a condition where a tracking servo system is open;

FIG. 11 is a timing chart illustrating a timing of a signal of each section according to the embodiment;

FIG. 13 is a timing chart illustrating a tracking error signal during the positioning of a recording beam according to the embodiment;

FIG. 20 is a block diagram illustrating the constructions of the tracking control circuit and the mirror control circuit;

FIGS. 21 and 22 are views illustrating positioning of a recording beam; and

DETAILED DESCRIPTION OF THE PREFERRED EMBODIMENTS

Preferred embodiments of the present invention will be explained below in detail with reference to the accompanying drawings.

Figure 6A:
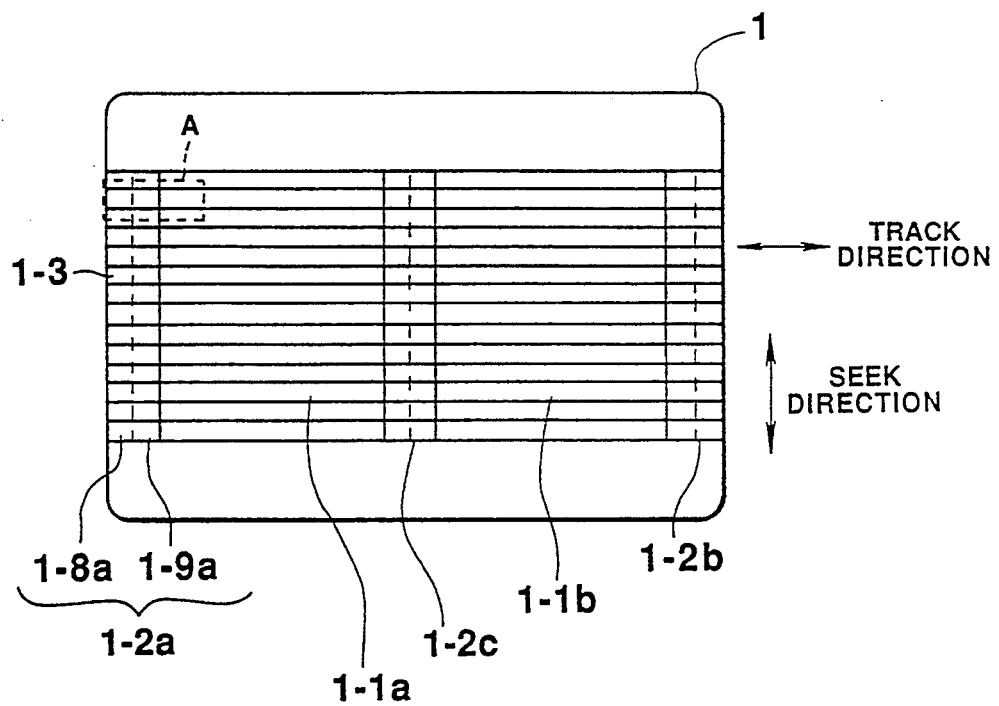
FIGS. 6a and 6b are views illustrating the construction of the optical card of the embodiment.

In an optical card 1 of this embodiment, as shown in FIG. 6a, an ID area 1-2c is further formed in the center of the optical card 1' of the prior art (shown in FIG. 1). Data area 1-1a is formed on the left side of the ID area 1-2c and data area 1-1b is formed on the right side thereof.

Figure 7:
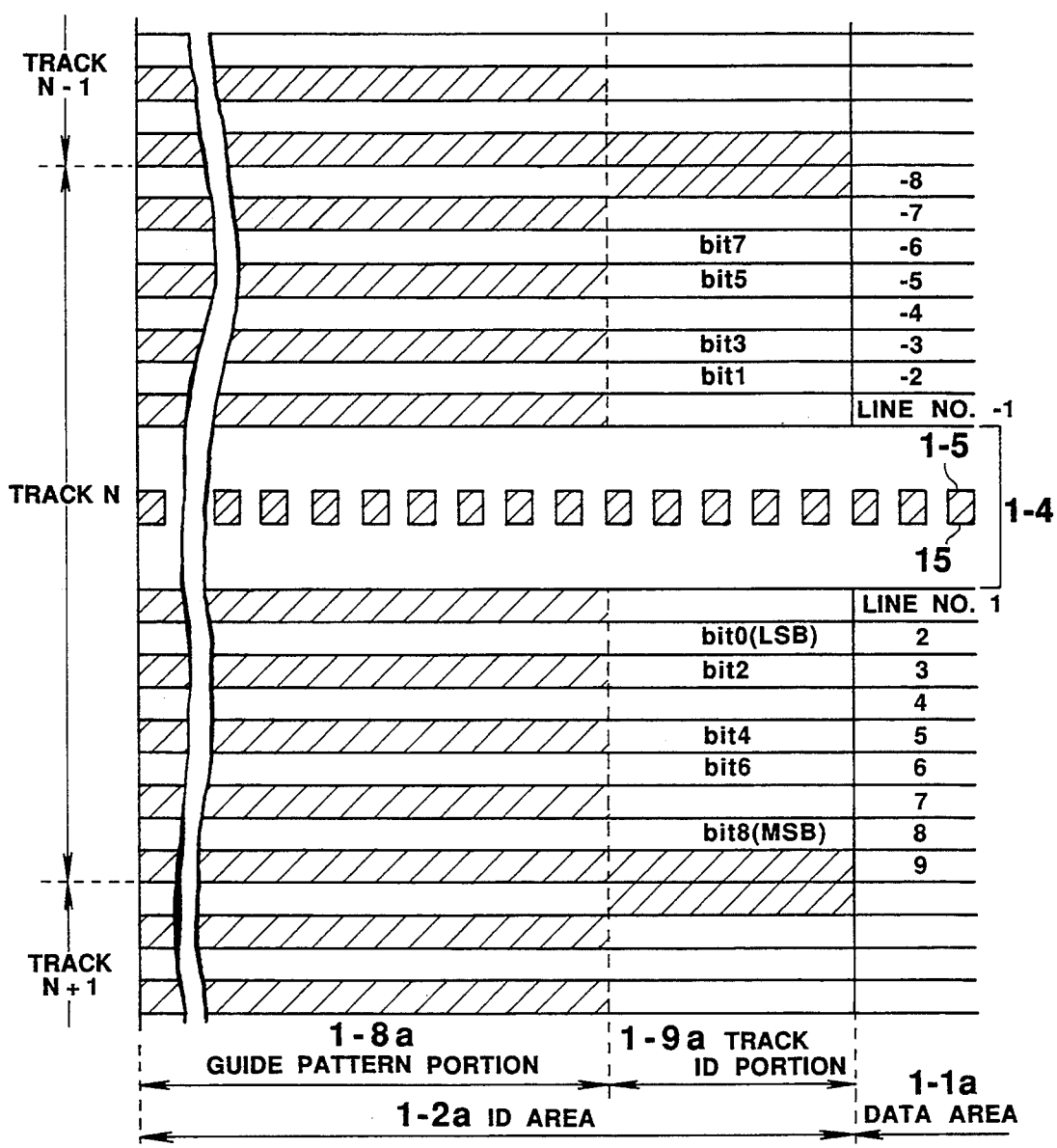

In addition, as shown in FIG. 7, the ID area 1-2a of the optical card 1 is divided into a guide pattern portion 1-8a and a track ID portion 1-9a in which track Nos. and recognition patterns are recorded in the same manner as in the prior art. In the guide pattern portion 1-8a, white and black patterns which become portions having a high and a low reflectance are alternately placed in the direction of the track width (in the seek direction). That is, in each track, white and black patterns are formed alternately in the form of a line (or in the form of a band) at both sides of the clock line area 1-4 in the direction of the track width at the central position of the track. As a consequence, guide patterns with a cycle of two information lines are formed.

In this specification, the guide pattern portion may be defined as follows.

The guide pattern portion is formed so as to extend white and black patterns which are formed alternately in the form of a line which extends in the direction of the track and these white and black patterns extend in the direction of the track width with definite spacing and this guide pattern portion is guide information for positioning of a recording beam to an arbitrary information line in a track (which is composed of a plurality of information lines).

Even though this guide pattern is provided in the ID areas 1-2b and 1-2c as well as in the ID area 1-2a, the guide pattern may be provided in at least one of the ID areas 1-2a, 1-2b and 1-2c.

Figure 6B:
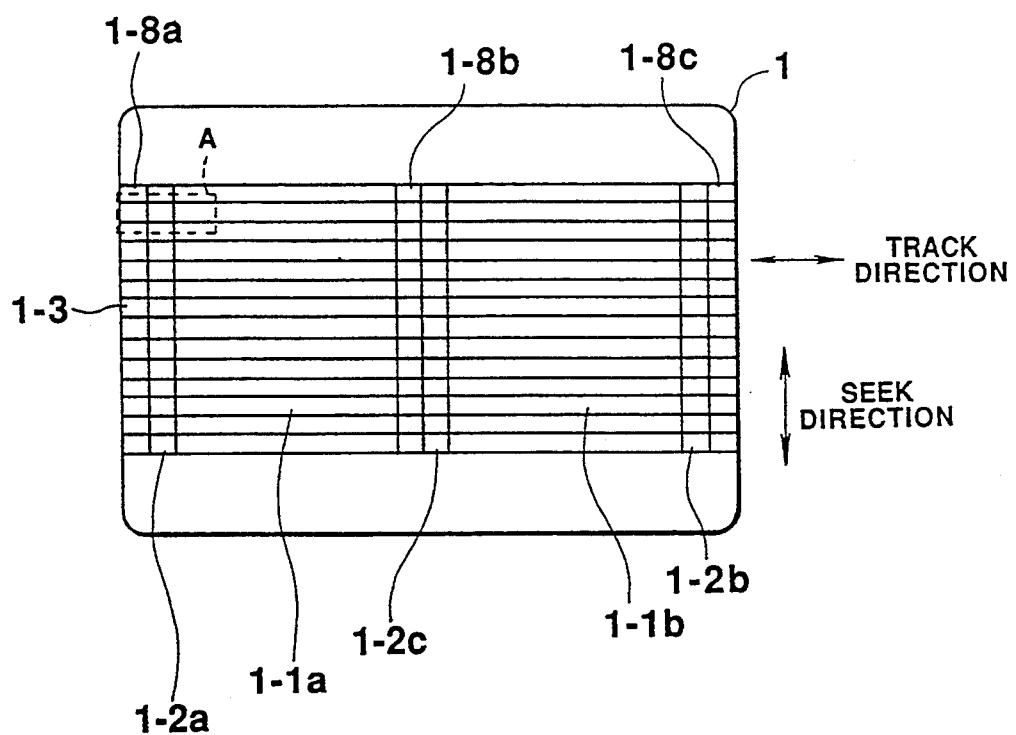

In the structure shown in FIG. 7, an area including the guide pattern portion 1-8a and the track ID portion 1-9a is defined as, for example, the ID area 1-2a. However, in the optical card 1 of this embodiment, the guide pattern portion 1-8a (and 1-8b, 1-8c) can be defined discriminately from the ID area 1-2a (and 1-2b, 1-2c), as shown in FIG. 6b.

That is, since the guide pattern portion and the track ID portion are formed separately from each other parallelly to the track, if the entire track is defined by two areas as in the prior art, the guide pattern portion 1-8a can be defined as belonging to the ID area 1-2a, as shown in FIG. 6a. If the entire track is defined by three areas considering that the guide pattern portion 1-8a does not exist in the prior art, the entire track can also be defined as shown in FIG. 6b.

An explanation will be given below according to the definition of FIG. 6a. The structure of FIG. 6a is essentially the same as that of FIG. 6b.

In the data area 1-1a, both sides of the clock pattern 1-5 are assigned line numbers +1 to +9 and −1 to −8, and have polarities with the clock pattern 1-5 as the center. The positive polarity indicates a forward direction, and the negative polarity indicates a backward direction.

Figure 8:
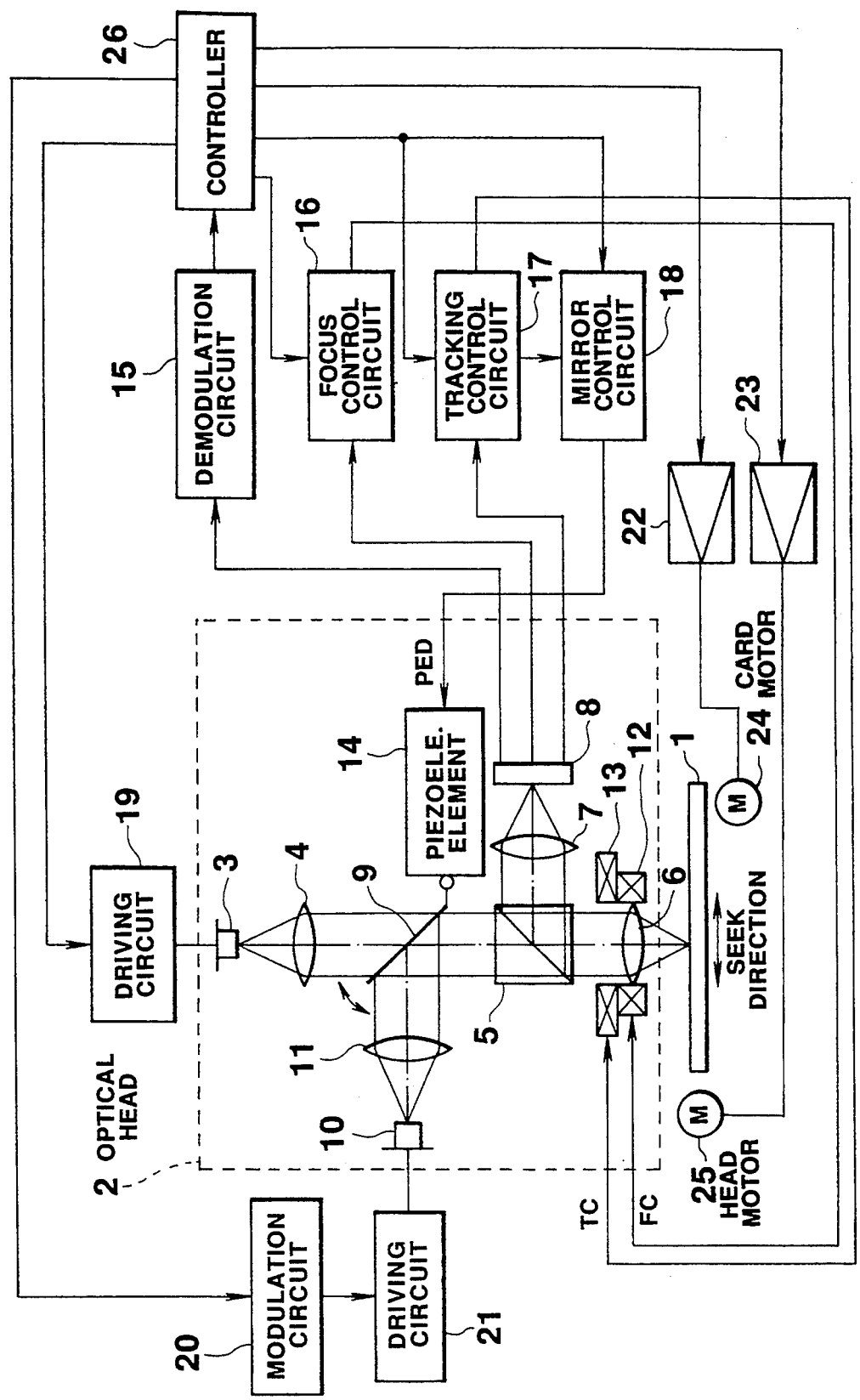

FIG. 8 shows the entire construction of an optical card recording/reproducing apparatus for recording-/reproducing information to/from the optical card 1 having a format in which a guide pattern portion is provided in the ID area.

In this embodiment, information is recorded to and reproduced from the optical card 1. A semiconductor laser (LD) 10 is driven only during recording, whereas a light-emitting diode (LED) 3 is driven during both recording and reproduction.

Information is recorded or reproduced by the optical card 1 being driven parallel direction (perpendicular to this sheet) to the track by a card motor 24, and an optical head 2 being driven perpendicular to the track (the seek direction) by a head motor 25, by means of driving circuits 22 and 23.

Figure 2:
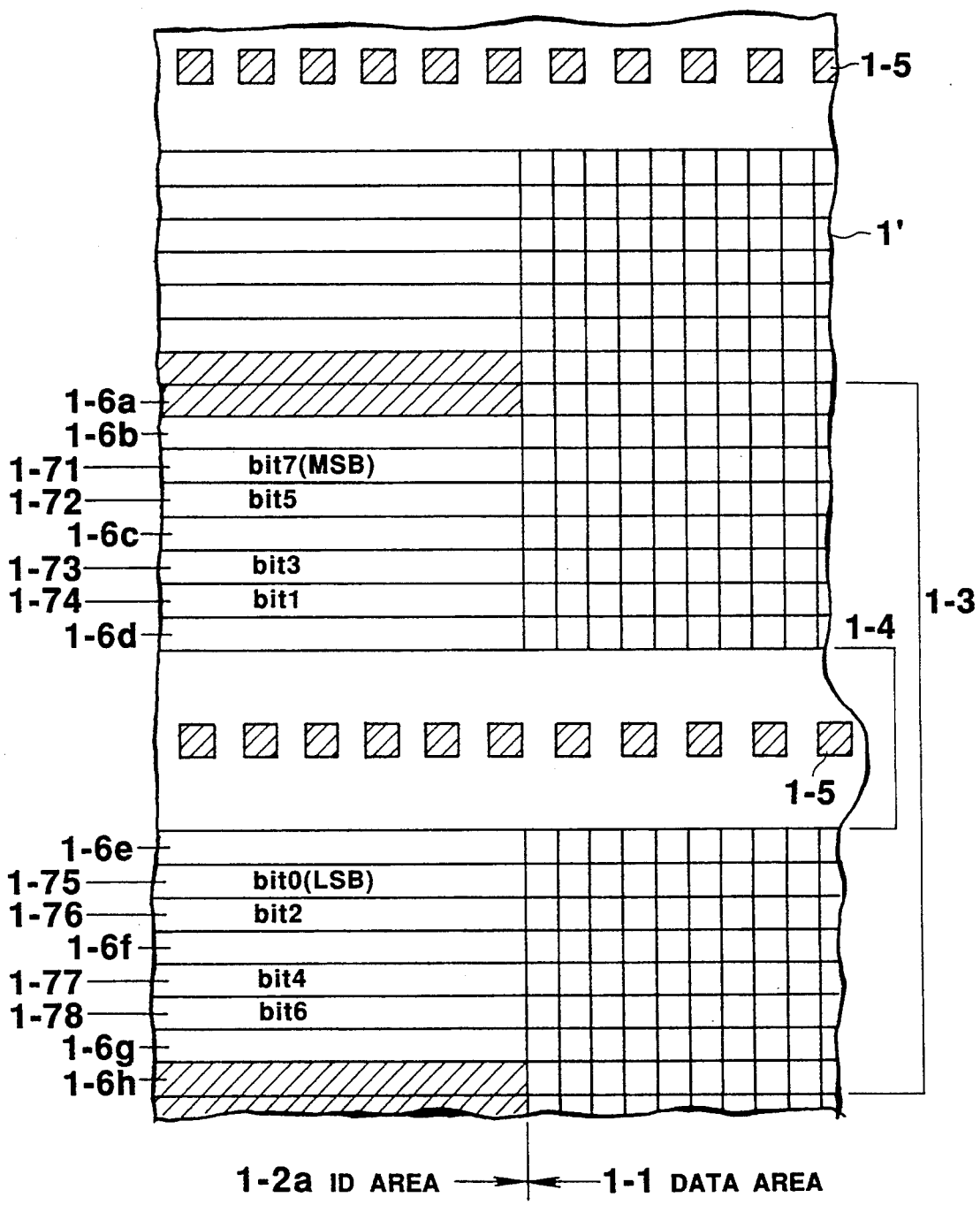
FIG. 2 shows the format of the recording surface of the optical card of the prior art.
Figure 4:
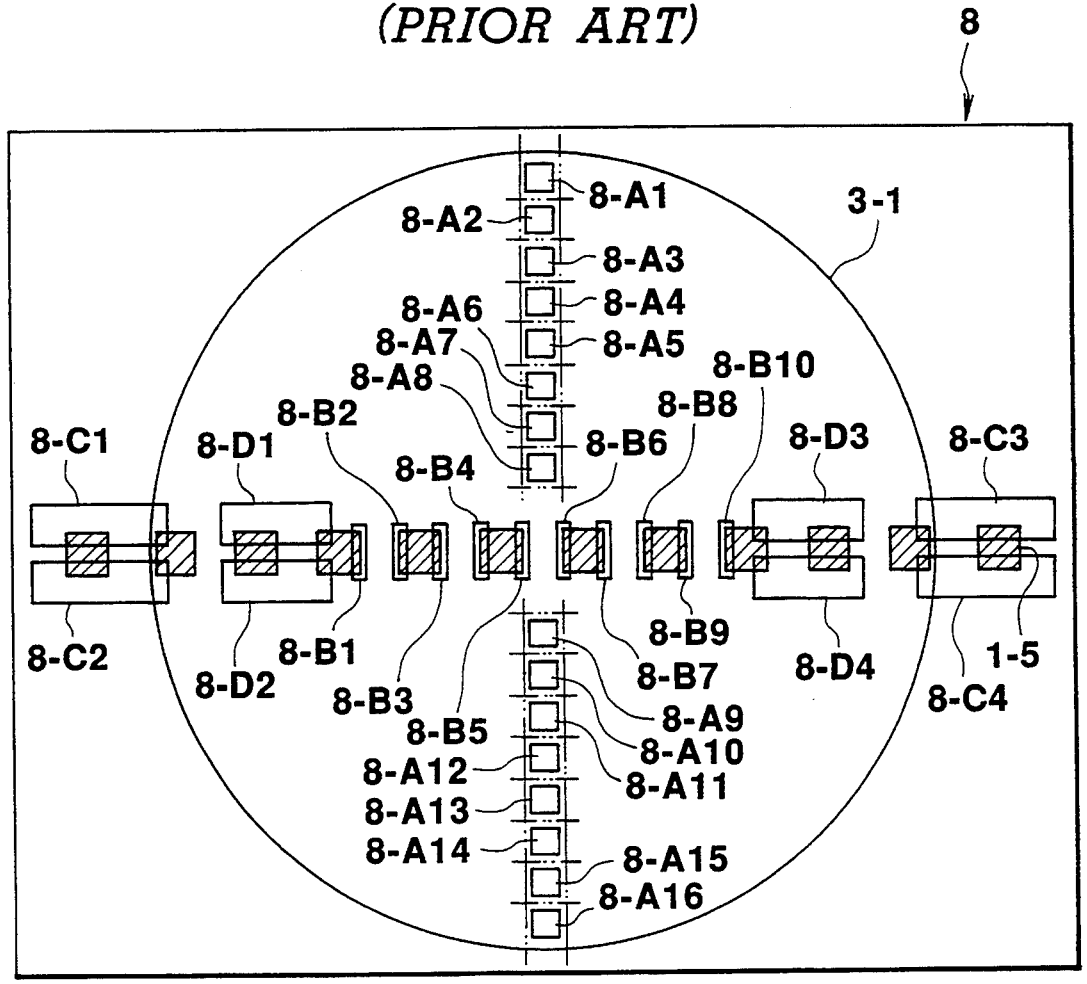
FIG. 4 is a view illustrating the construction of a photodetector of the prior art.
Figure 5:
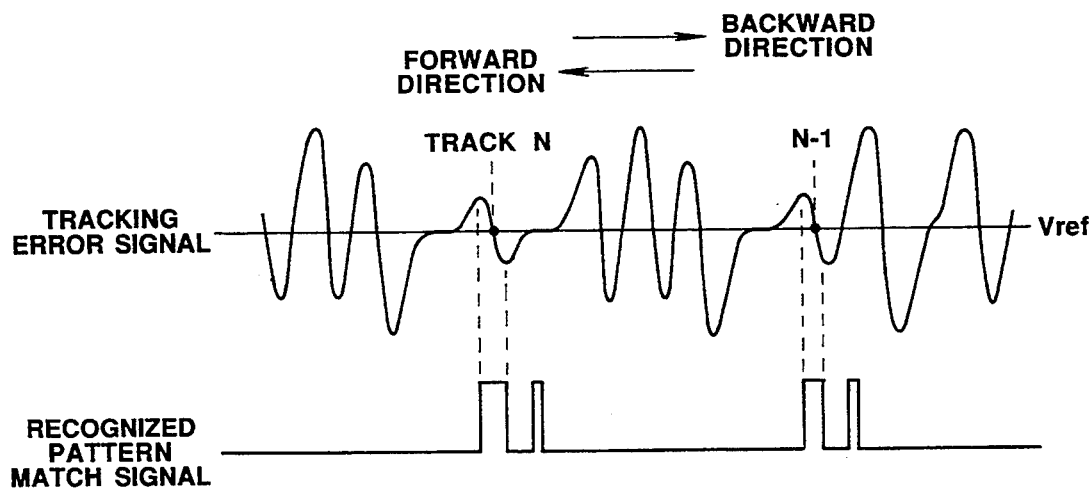
FIG. 5 is a wave chart illustrating a case where a target track is accessed using a tracking error signal according to the prior art.

Light from the LED 3 controlled through a driving circuit 19 is projected onto the optical card 1 after passing through the collimator lens 11, the dichroic mirror 9, the half prism 5 and the object lens 6, and a spot is illuminated in an area wide enough to cover one track width of the information tracks. The light reflected from the optical card 1 is received by the photodetector 8 after passing through the object lens 6, the half prism 5 and the image forming lens 7. This photodetector 8 has the same construction as the photodetector 8 explained in the prior art shown in FIG. 4.

Light from the LD 10 controlled through a modulation circuit 20 and a driving circuit 21 is projected onto the optical card 1 as a fine recording beam within the illumination area by the LED 3 after passing through a collimator lens 11, the dichroic mirror 9, the half prism 5 and the object lens 6. This projection causes the recording surface of the optical card 1 to be physically changed, and thus, information is recorded. The reflected light thereof is received by the photodetector 8 after passing through the object lens 6, the half prism 5 and the image forming lens 7 in the same manner as described above.

The surface of the dichroic mirror 9 is coated, made from a material through which light (wavelength: 860 nm) from the LED 3 is effectively transmitted and light (wavelength: 780 nm) from the LD 10 is effectively reflected.

Detection signals converted into electrical signals by the photodetector 8 are input to a demodulation circuit 15, whereby a read signal which is a reproduction signal and a clock signal which serves as a timing reference during recording/reproduction are output.

Furthermore, some of the detection signals detected by the photodetector 8 are input to a focus control circuit 16 and a tracking control circuit 17, whereby a focus error signal and a tracking error signal are generated, respectively. The focus error signal and the tracking error signal become a focus control signal FC and a tracking control signal TC, respectively, after passing through driving circuits within the control circuits 16 and 17.

These signals are applied to a focus coil 12 and a tracking coil 13 within the optical head 2.

In response to these control signals FC and TC, the object lens 7 is driven back and forth with respect to the optical card 1 (in the direction perpendicular to the surface of the optical card 1) and in the seek direction (in the direction of the track width).

Thus, autofocus control and auto-tracking control are performed.

To position a recording beam from the LD 10 on a desired information line (a recording line), a mirror control circuit 18 generates a position signal corresponding to a tracking error signal so as to cause a piezoelectric elements 14 to be driven and cause the dichroic mirror 9 to be rotated. Thus, positioning is performed accurately.

Figure 9:
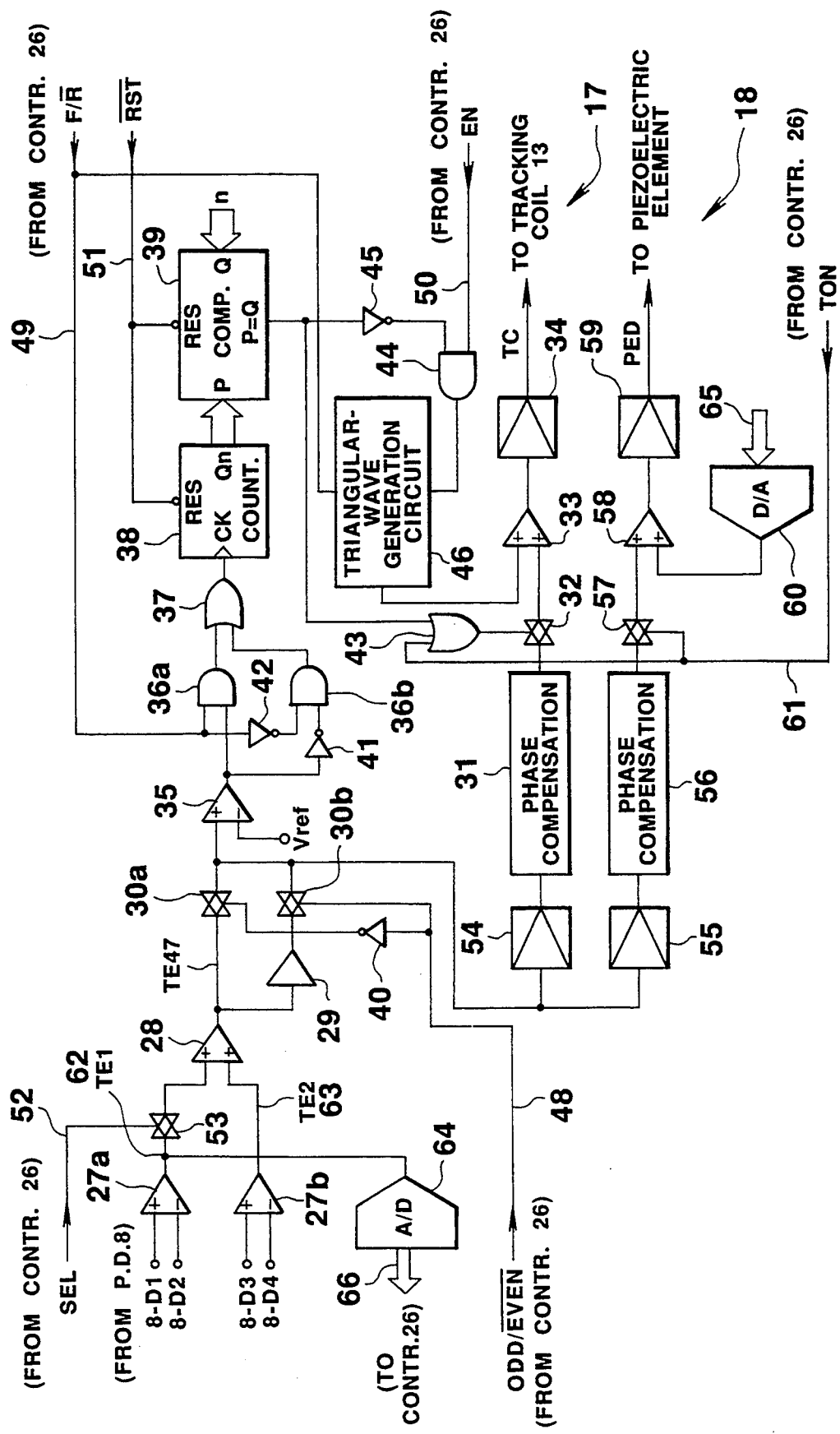

FIG. 9 shows a specific example of the tracking control circuit 17 and that of the mirror control circuit 18. These circuits are designed to position a recording beam on a desired recording line within a desired track.

Outputs from photoreceptive areas for detecting servo signals 8-D1 and 8-d2 and photoreceptive areas for detecting servo signals 8-D3 and 8-D4 (see FIG. 4), which are a part of the photodetector 8, are input to differential amplifiers 27-a and 27-b, respectively, and are generated tracking error signals TE1 (62) and TE2 (63) for each of them (a combination of one half of the photoreceptive areas for detecting servo signals). The tracking error signals TE1 (62) via an analog switch 53 and TE2 (63) are supplied to an addition circuit 28 and a tracking error signal TE (47) in its entirety is generated. This signal TE (47) is input to an analog switch 30b through an analog switch 30a and an inverter 29.

The output from the differential amplifier 27-a is also input to an A/D converter 64, and the converted digital value is output to a controller 26. A control signal (SEL) 52 from the controller 26 is supplied to the control terminal of the analog switch 53. When the control signal SEL is at level High, the tracking error signal TE=TE1+TE2; when the control signal SEL is at level Low, the tracking error signal TE=TE2. That is, the control signal SEL selects the tracking error signal to be used.

The tracking error signal TE1 (62) is used when positioning is performed by using a recording beam. When positioning is performed by using wide-area illumination light, two signals TE1 (62) and TE2 (63) are used.

A control signal (Odd/Even) 48 from the controller 26 is supplied to the control terminals of the analog switches 30a and 30b through an inverter 40, thereby outputs are selected. One of the outputs is supplied to an operational amplifier 54 and becomes the tracking control signal TC after passing through a phase compensation circuit 31, an analog switch 32, an addition circuit 33 and a driving circuit 34. The signal TC is output to the tracking coil 13, and thus a tracking servo loop is formed. This tracking servo loop is used to control the position of the object lens 6 in the direction of the track width. The control signal (Odd/Even) 48 is used for positioning on odd-numbered and even-numbered lines.

A signal selected after passing through the analog switches 30a and 30b is also supplied to an operational amplifier 55 and becomes a piezoelectric element driving signal PED after passing through a phase compensation circuit 56, an analog switch 57, an addition circuit 58 and a driving circuit 59. As the signal PED is output to the piezoelectric element 14, a servo loop is formed. The position of the recording beam is controlled by the dichroic mirror 9 being rotated.

The outputs from the analog switches 30a and 30b are also supplied to a comparator 35 where the outputs are compared with a reference voltage Vref set at a reference level of zero cross or the like. The output thereof is input to an AND gate 36a and one of the input terminals of an AND gate 36b through an inverter 41.

A control signal (F/$\overline{R}$) 49 from the controller 26 is input to the AND gate 36a and the other input terminal of the AND gate 36b through an inverter 42. Each of the outputs is input to an OR gate 37, and the output thereof is input to a clock terminal (CK) of a counter 38. The output (Qn) of the counter 38 is supplied to a comparison terminal P of a comparator 39 as binary codes, and a set value (n) from the controller 26 is supplied to a comparison terminal Q of the comparator 39 as binary codes. The output of the comparator 39 is supplied to the control terminal of the analog switch 32 through an OR gate 43 so as to open/close the servo loop.

The output of the reset terminal of the counter 38 and that of the comparator 39 are initialized when a control signal (RST) 51 is supplied from the controller 26.

A triangular-wave signal from a triangular-wave generation circuit 46 is input to the other input terminal of the addition circuit 33, and a predetermined voltage for driving the object lens 6 in the direction of the track width is supplied. The control signal (F/$\overline{R}$) 49 for controlling the direction in which the object lens 6 is driven is supplied to the triangular-wave generation circuit 46 from the controller 26. The triangular-wave generation circuit 46 generates a triangular-wave signal of a polarity for driving the object lens 6 in a forward or backward direction according to the two-valued level of the control signal (F/$\overline{R}$) 49.

Input to this triangular-wave generation circuit 46 are a control signal (EN) 50 for controlling a driving operation in the direction of the track width from the controller 26 and the output of an AND gate 44 which accepts the output of the comparator 39 through an inverter 45 as an input. A triangular-wave signal for driving the object lens 6 is output after the control signal (EN) 50 reaches a high level (at this time, the comparator 39 is in a condition in which no match exists, the output which has been passed through the inverter 45 at level Low is turned to a high level, and the AND gate 44 permits the high-level signal of the control signal (EN) 50 to pass therethrough) until the comparator 39 outputs a matching signal.

The output of a D/A converter 60 which converts the digital value 65 from the controller 26 is supplied to the other input terminal of the addition circuit 58. The output of the addition circuit 58 is input to the piezoelectric element 14 after passing through a driving circuit 59, causing the dichroic mirror 9 to rotate so as to cause the recording beam to move in the direction of the track width. Thus, initial positioning control is performed.

A control signal (TON) 61 from the controller 26 is supplied to the analog switches 32 and 57 through the OR gate 43 to control the opening/closing of each servo system loop.

Figure 10:
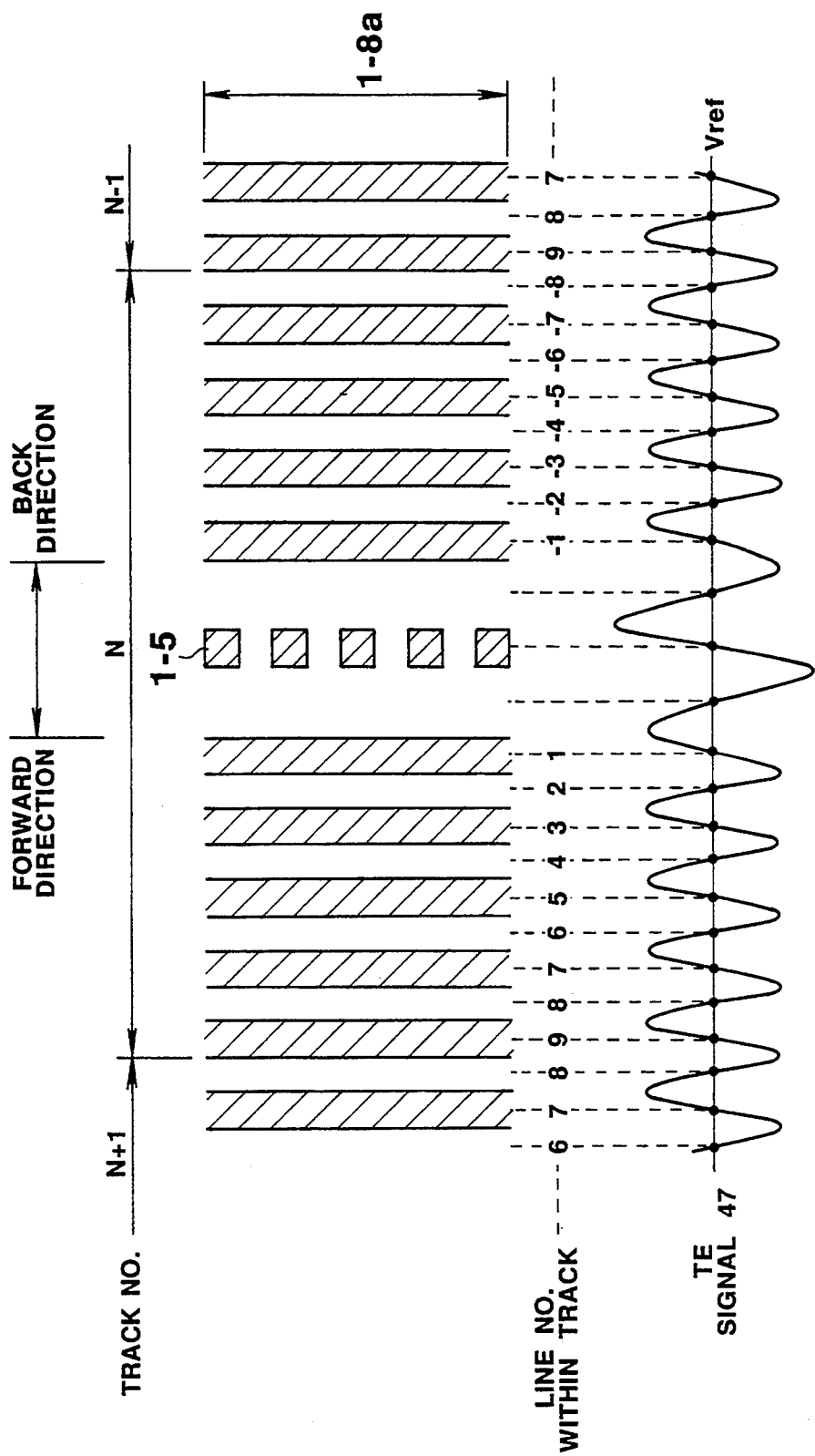

FIG. 10 shows the TE signal 47 when the optical head 2 is moved forward or backward in a direction of the track width on the guide pattern portion 1-8a of the ID area 1-2a in a condition in which the tracking servo system is open. The zero cross point (both edges) of the TE signal 47 corresponds to the center of each line. Therefore, positioning on a desired line can be performed by performing control so that this TE signal 47 becomes the zero cross point.

Figure 12A:
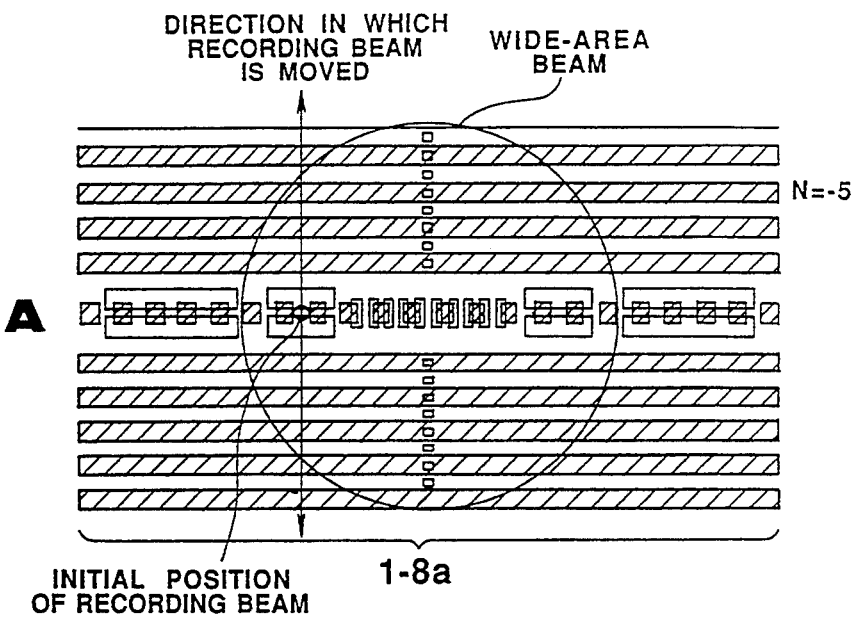
FIGS. 12a-c are views showing a method of positioning a recording beam according to the embodiment.

Next, the operation for positioning a recording beam on line number $=-5$ and line number $=+2$ in a desired track (e.g., track number $=N$) shown in FIG. 10 on the basis of the above-described construction will be explained. Initialization is performed beforehand so that, when a driving signal PED is not supplied to the piezoelectric element 14, the recording beam is positioned in the vicinity of the center of the clock pattern 1-5 of an arbitrary track 1-3. It is assumed that the dichroic mirror 9 is mechanically initialized so that the movement of the recording beam in the direction of the track width is on substantially the center line of the photoreceptive areas for detecting servo signals 8-D1 and 8-D2 (see FIG. 12A).

A. When positioning on line number $=-5$ is performed:
1. The optical head 2 is moved on the track ID portion 1-9a of the ID area 1-2a under the control of the controller 26. The track number when both the zero cross signal of the tracking error signal and a recognition pattern matching signal are obtained is read out by the demodulation circuit 15, and then the track servo is closed. Thus, positioning on a target track is performed. The track servo is opened during seek (that is, the control signal (TON) 61 is set to a low level).
2. The optical head 2 is moved by the head motor 25 and stopped at the central position of the guide pattern portion 1-8a (in the direction parallel to the track) when a predetermined number of clocks generated in the clock pattern 1-5 in the direction parallel to the track are counted (see FIG. 12A). As shown in this figure, the length of the guide pattern 1-8a in the direction parallel to the track is larger than one track width and the guide pattern 1-8a is formed to be larger than the diameter of a beam spot of illumination light.
3. A tracking drive current being supplied to the object lens 6 within the servo is monitored so that the object lens 6 can be used at a position as close to a free position as possible (a position at which the electric current being supplied to the tracking coil is stopped), and the optical head 2 is driven in a direction opposite to the direction offset from the free position of the object lens 6 in proportion to the amount of the electric current.

A position sensor may be disposed near the object lens 6 as a means for detecting the position of the object lens 6 instead of detecting the tracking drive current. Next, the control signal (TON) 61 from the controller 26 is set to a low level, causing the servo loop to be open.

Figure 11:
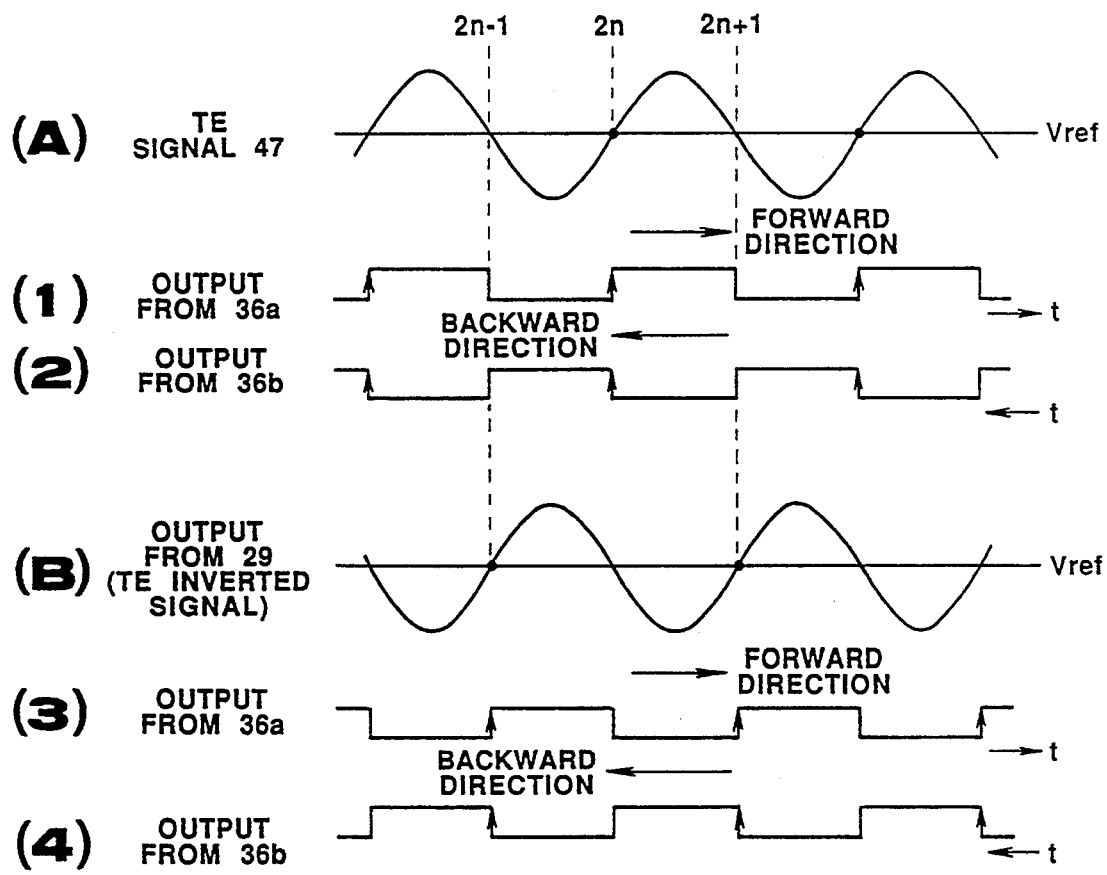
Figure 12B:
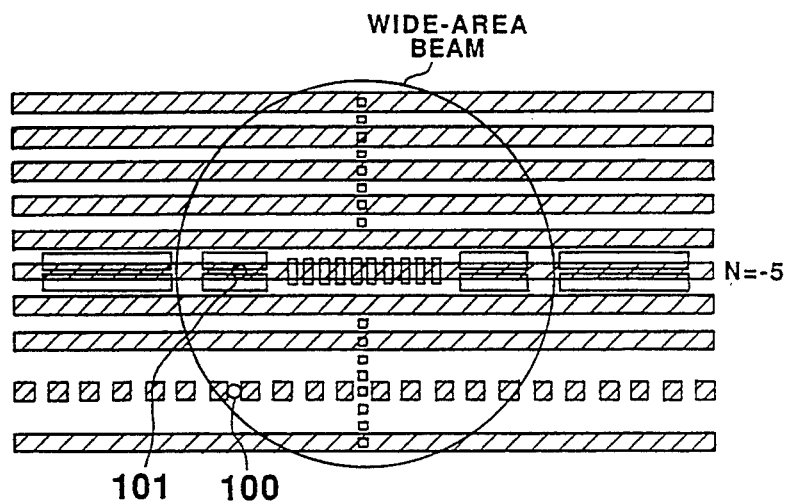

4. A movement distance (n=3) is set by the controller 26 in the comparator 39 in the form of a binary code (n=(N+1)/2, N being an absolute value of the line number).
5. Since the movement is a backward movement, the control signal (F/$\overline{R}$) 49 from the controller 26 is set to a low level.
6. Since the line number is an odd number, the control signal (Odd/$\overline{Even}$) 48 from the controller 26 is set to a high level.
7. The control signal (RST) 51 from the controller 26 is set to a high level, and the functions of the counter 38 and the comparator 39 are enabled.
8. The control signal (EN) 50 from the controller 26 is set to a high level. A backward driving voltage for driving (moving) in a backward direction is supplied to the tracking coil 13 from the triangular-wave generation circuit 46 through the addition circuit 33 and the driving circuit 34, causing the object lens 6 to shift in the direction of the track width.
9. When the object lens 6 is shifted, the TE signal 47 is output (see FIG. 11(B)), and a signal shown in FIG. 11(4) is input to the clock input terminal of the counter 38.
10. When the counter 38 counts three rise edges, the comparator 39 outputs a high level as a matching signal, thus stopping the addition of the backward driving voltage from the triangular-wave generation circuit 46. At the same time, the analog switch 32 is turned on via the OR gate 43, and the tracking servo loop is closed to position the object lens 6.
11. The control signal (SEL) 52 from the controller 26 is set to a low level to satisfy the relation TE=-TE2. The object lens 6 is controlled by this TE signal.
12. The LD 10 which has been extinguished until now is made to go on at such a low output that writing is impossible. The light is projected onto the optical card 1 as a fine recording beam. The position to which the recording beam is projected is designated as reference numeral 100 in FIG. 12B.

13. The controller 26 causes the digital value 65 (corresponding to the variable value of the dichroic mirror 9) of the D/A converter 60 to vary, causing the position at which the recording beam is irradiated to move from the position 100 to a position 101.

In this case, since the direction of the movement of the recording beam can be determined (for example, a backward direction in this case) on the basis of the polarity (for example, negative as the line number is $-5$ in this case) of the line number which is a movement target position, the controller 26 causes the digital value 65 to increase (or decrease) so as to cause the recording beam to move in a backward direction.

14. The dichroic mirror 9 is rotated and the recording beam is moved. The controller 26 monitors the tracking error signal TE1 which is converted into a digital value 66 through the A/D converter 64. The digital value 66 is for designating that the recording beam has reached a target line.

Figure 13:
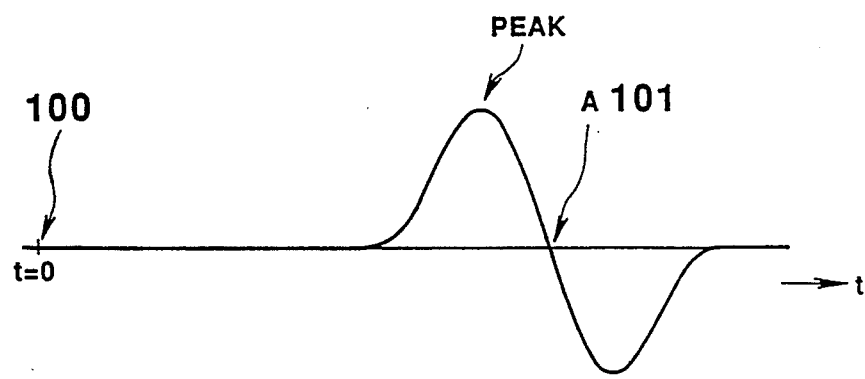

FIG. 13 shows a condition in which the tracking error signal TE1 has moved from position 100 to position 101. In this figure, point A indicates that the target line of $-5$ has been reached. As the recording beam has been moved at a position away from the photoreceptive areas 8-D1 and 8-D2 for some time from when it has started to move from position 100, the output of the tracking error signal TE1 continues to be zero.

Since point A is also at level zero, to judge only point A, it is checked whether the peak shown in FIG. 13 has been exceeded. That is, it is determined that, when level zero is detected after the peak has been exceeded, the target line has been reached. Whether the peak has been exceeded can be determined, for example, by detecting the time when the output is changed from an increasing one to a decreasing one by calculating the differential output.

15. The recording beam is further displaced, and when the monitor amount 66 is determined to be zero, the recording beam has reached a target line ($N=-5$ in this case). (see FIG. 12B)

16. The controller 26 retains the displacement amount 65 when the recording beam is positioned and causes the LD 10 to stop emitting light.

17. With RST and TON being set to a low level, the controller 26 causes the tracking servo loop to open. Also, the output from the triangular-wave generation circuit 46 is stopped. As input to the tracking coil 13 ceases, the object lens 6 supported by an elastic member returns to a free position (substantially the center line of the clock pattern 1-5) due to the elastic force of the elastic member. In contrast, the position of the recording beam irradiated through the dichroic mirror 9 is maintained at line $n=-5$.

Figure 12C:
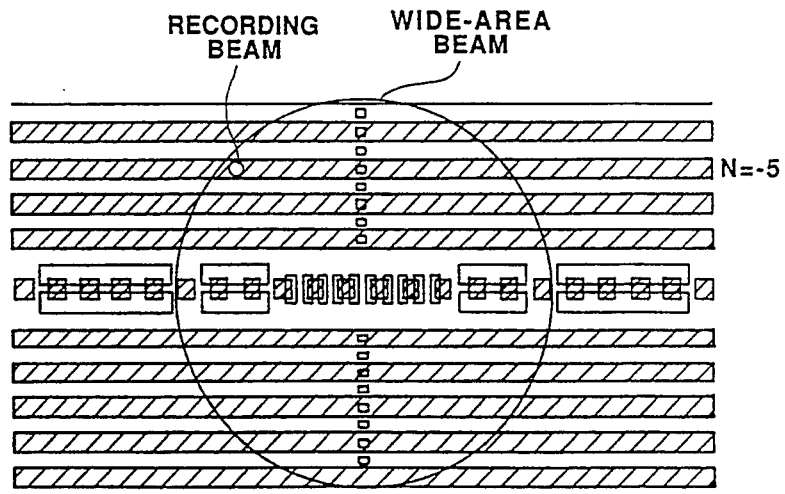

18. After the position of the object lens 6 is determined, the controller 26 sets SEL to a high level and then sets TON to a high level, causing the tracking servo loop to be closed. Thus, positioning is completed. The position of the recording beam irradiated through the dichroic mirror 9 is maintained at line $n=-5$ (see FIG. 12C).

19. The output of the LD 10 is changed to such a high output that writing is possible in synchronization with a clock signal from the time when the data area is reached while the optical card 1 and the optical head 2 are being relatively moved in the direction of the track. The recording beam is sequentially projected onto the optical card 1, thus forming pits.

B. When positioning on line number $=+2$ is performed:
 1. Positioning to a target track is performed on the track ID portion 1-9a.
 2. The optical head 2 is moved to substantially the center position of the guide pattern portion 1-8a.
 3. Shift correction of the object lens 6 is performed, and the servo loop is made open.
 4. A movement distance ($n=2$) is set in the comparator 39 ($n=N/2+1$, being an absolute value of the line number).
 5. Since the movement is a forward movement, the control signal (F/R) 49 is set to a high level.
 6. Since the line number is an even number, the control signal (Odd/$\overline{\text{Even}}$) 48 is set to a low level.
 7. The control signal (RST) 51 is set to a high level, and the functions of the counter 38 and the comparator 39 are enabled.
 8. The control signal (EN) 50 is set to a high level. A forward driving voltage is supplied to the tracking coil 13 from the triangular-wave generation circuit 46, causing the object lens 6 to shift in the direction of the track width.
 9. When the object lens 6 is shifted, the TE signal 47 is output (see FIG. 11(A)), and a signal shown in FIG. 11(1) is input to the clock input terminal of the counter 38.
 10. When the counter 38 counts two rise edges, the shifting of the object lens 6 is stopped and the tracking servo loop is closed. Thus, the object lens 6 is positioned.
 11. The object lens 6 is controlled by setting the tracking error signal at $TE=TE2$.
 12. The LD 10 is made to emit light at a low output, and a fine recording beam is projected onto the optical card 1.
 13. The dichroic mirror 9 is rotated to displace the recording beam. Monitoring of the monitor amount is continued to determine an extreme value (a maximum value or a minimum value).
 14. The recording beam is further displaced, and when the monitor amount is determined to be zero, it follows that the recording beam has reached a target line (see FIG. 12B, $N=-5$ is replaced with $N=2$).
 15. The displacement amount 65 when the recording beam is positioned is retained and the light emission of the LD 10 is stopped.
 16. With the tracking servo loop being open, the object lens 6 is returned to a free position.
 17. After the object lens 6 is adjusted, the tracking servo loop is closed. Thus, positioning is completed (see FIG. 12C).
 18. The output of the LD 10 is set to a high output in synchronization with the clock signal. The recording beam is sequentially projected onto the optical card 1, thus forming pits.

When the series of recording/reproducing operations are performed in the above-described way in FIG. 8, during reproduction of information in a target track, first the optical head 2 is driven to a target track in the seek direction by means of the head motor 25 while focus control is being performed. When the target track is detected, the head motor 25 is stopped and at the same time tracking control is initiated.

Thereafter, while the optical card 1 and the optical head 2 are relatively moved in the direction of the track by means of the card motor 24, information is reproduced from the demodulation circuit 15 in synchronization with the clock signal. During recording of information in the target track, while the optical card 1 and the optical head 2 are relatively moved in the direction of the track by means of the card motor 24 while focus and tracking control are being performed in the same manner as during the above reproduction in a condition in which the recording beam from the LD 10 is positioned on a specific recording line in the target track, the light from the LD 10 is modulated in synchronization with the clock signal, causing information to be recorded on the recording surface of the optical card 1.

In the same manner as above, the recording beam is positioned on recording lines $\pm 2$, $\pm 3$, ..., $\pm 8$ as required, and information is recorded on all the recording lines of the target track. The value Q of the comparator 39 is determined by $N/2+1$ when line number N is an even number and by $(N+1)/2$ when line number N is an odd number.

According to this embodiment, as described above, since a guide pattern portion for positioning on a desired line in the direction of the track width is provided within the ID area or adjacent to the ID area, a recording beam can be positioned on a desired line in each track formed of a plurality of lines, with a simple circuit arrangement in a short time. As a result, an apparatus having a function of recording can be realized with a simple construction and at a low cost. It is also possible to miniaturize the apparatus.

Furthermore, in this embodiment, since a fine light beam is irradiated onto a desired line, and a signal indicating a line position deviation from the desired line is detected in order to perform positioning, reliable positioning on a desired line can be performed.

In addition, the guide pattern portion is formed of a cycle of two lines symmetrically at both sides of the clock line in the center of the track. Therefore, the amplitude of a tracking error signal generated from reflected light detected when the optical head is moved in the direction of the track width, is substantially constant. Thus, tracking retraction (line retraction) is made easier. In the prior art, in contrast, since patterns in the direction of the track width change according to the track number, the amplitude of the tracking error signal detected when the optical head is moved in the direction of the track width, is changed.

Next, an explanation will be given about an optical card and an optical card recording/reproducing apparatus which is capable of reading out noticed information in a short time and writing ancillary information with a simple recording apparatus by a method wherein additional information can be written in reproduction-only information on recording lines within the same track as a result of setting only a specific recording line in a plurality of recording lines which form tracks to a user recording line.

Figure 14:
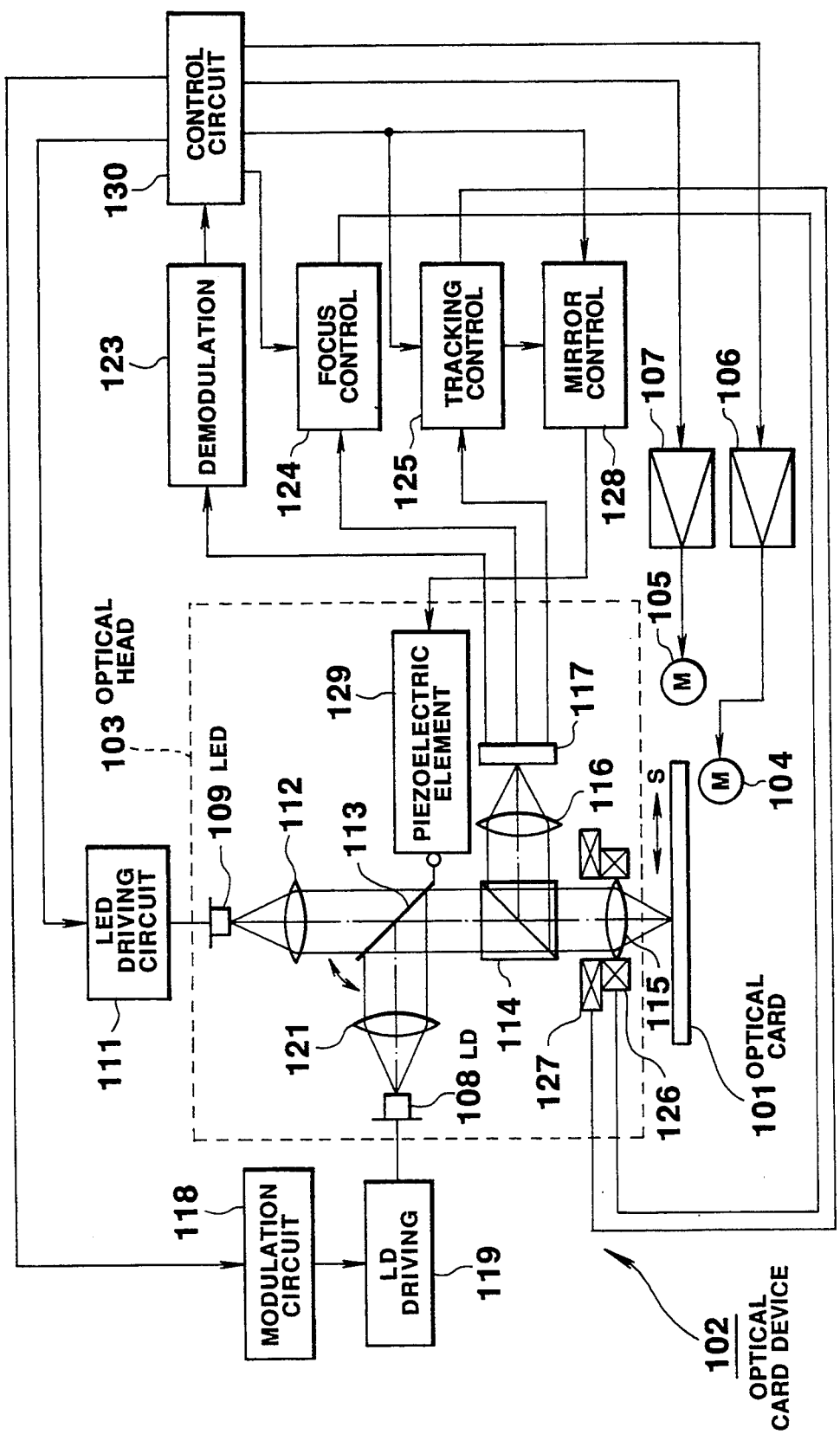
FIG. 14 is a block diagram illustrating the construction of the optical card recording/reproducing apparatus.

As shown in FIG. 14, in an optical card recording/reproducing apparatus (hereinafter abbreviated to an optical card apparatus) for recording information to and/or reproducing information from an optical card 101, an optical head 103 is placed facing the optical card 101. The optical card 101 is moved in the direction of the track of the optical card 101 by means of a card motor 104. The optical head 103 is transported by a head motor 105 in the direction S of the track width (also referred to as the seek direction) perpendicular to the tracks. The card motor 104 and the head motor 105 are driven by driving circuits 106 and 107, respectively.

The optical head 103 has incorporated therein a laser diode 108 which generates a light beam only during recording in order to record information in the optical card 101, and a light-emitting diode (abbreviated hereinafter to LED) 109 which emits light during both recording and reproduction. This LED 109 is driven by an LED driving circuit 111. Light from the LED 109 is formed into parallel light beams by a collimator lens 112. These light beams which are transmitted through a mirror 113 and a half prism 114 are condensed by an object lens 115 and then projected onto the optical card 101. A light spot wide enough to cover the track width of an information track is illuminated.

Light reflected from the optical card 101 due to the wide-area spot illumination is condensed by the object lens 115. Light reflected by the half prism 114 is received by a photodetector 117 after passing through an image forming lens 116.

In contrast to the above, the laser diode 108 is driven to emit light by recording data modulated by a modulation circuit 118 after passing through an ld driving circuit 119. Light of the laser diode 108 is formed into parallel light beams by a collimator lens 121. After the light beams are reflected by the mirror 113, they are transmitted through the half prism 114 and projected onto the optical card 101 as a fine recording beam within a wide-area illumination area of the LED 109. This projection causes the recording surface of the optical card 101 to be physically changed, and thus information is recorded. The reflected light of the optical card 101 is received by the photodetector 117 after passing through the object lens 115, the half prism 114 and the image forming lens 116 in the same manner as described above.

A predetermined coating is applied to the surface of the mirror 113, so that light (for example, line having a wavelength: 860 nm) from the LED 109 is effectively transmitted and light (for example, line having a wavelength: 780 nm) from the laser diode 108 is effectively reflected.

Detection signals converted into electrical signals by the photodetector 117 are input to a demodulation circuit 123, and a read signal which is a reproduction signal and a clock signal which becomes a timing reference during recording/reproduction are output. Furthermore, some of the detection signals are input to a focus control circuit 124 and a tracking control circuit 125, which output a focus error signal and a tracking error signal, respectively. These signals are input to a focus coil 126 and a tracking coil 127 within the optical head 103 via an unillustrated driving circuit, respectively. This causes the object lens 115 to move perpendicularly to the surface of the optical card 101 and in the seek direction S. Thus, autofocus control and auto-tracking control are performed.

To position a recording beam from the laser diode 108 on a desired recording line, a mirror control circuit 128 generates a position signal corresponding to the tracking error signal. A piezoelectric element 129 is then driven in response to the position signal, causing the mirror 113 to rotate. Thus, accurate positioning is performed.

The driving circuits 106 and 107, the LED driving circuit 111, the modulation circuit 118, the focus control circuit 124, the tracking control circuit 125 and the mirror control circuit 128 are controlled by a control circuit 130. An output signal of the demodulation circuit 123 is input to the control circuit 130.

Figure 15A:
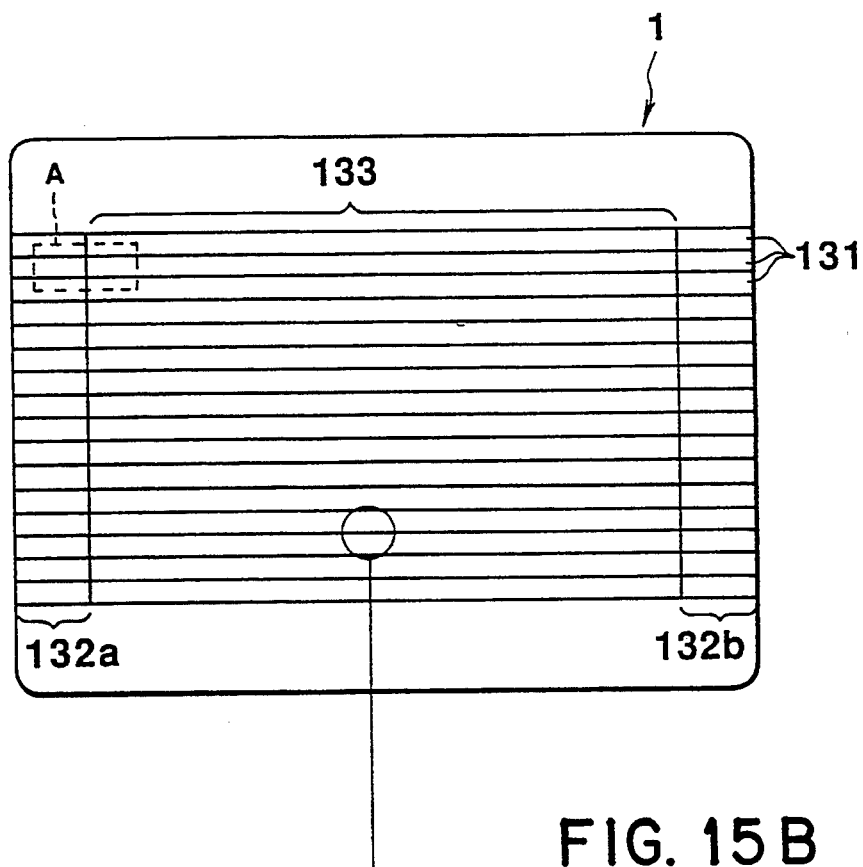
FIG. 15 is a view illustrating the structure of the optical card in which a specific line of each track is made into a user record line.
Figure 15B:
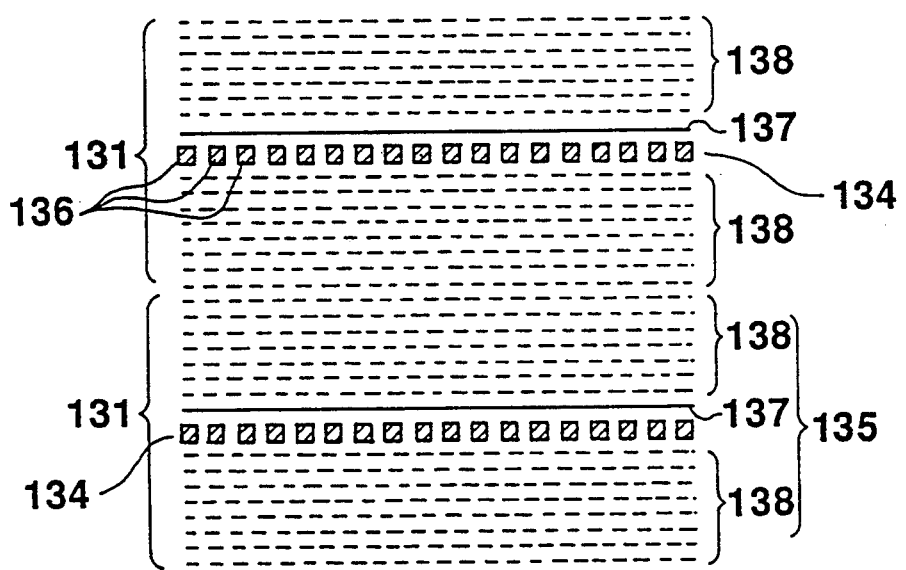

The optical card 101 of this embodiment is shown in FIG. 15. In this optical card 101, information is recorded as pits and reproduced optically. This information is recorded/reproduced in a unit called a track 131. A plurality of tracks 131, 131, ..., 131 arranged in lines parallel to each other are provided to form one of the optical cards 101.

ID areas 132a and 132b are formed at respective ends of each track 131 in the optical card 101. In both of the ID areas 132a and 132b, a track number and a recognition pattern the same for all of the tracks, for recognizing the track number, are prerecorded, thus making it easy to seek a target track. The area between the ID areas 132a and 132b at both ends of each track 131 is a data area 133 in which prerecorded information and information which will be recorded optically are stored.

Each of the tracks 131 has the structure shown in an enlarged view of FIG. 15. It consists of a clock line area 134 in the central portion thereof and a recording area 135 formed at both sides of the clock line area 134 in the direction of the track width. A clock pattern 136 formed of white and black patterns which extend in the direction of the tracks is prerecorded in the clock line area 134. The recording area 135, having lines 8 bits long, is formed at both sides thereof (a total of 16 bits).

A line-shaped recording area nearest to the clock line area 134 in the recording area 135 is formed into an optically writable user recording line 137, and the remaining recording area in 15 lines is set to a reproduction-only ROM area 138. Reproduction-only fixed data is preformatted in the ROM area 138. Ancillary information of the ROM area 138 of each of the tracks 131 can be written in the user recording line 137 within the track 131.

Figure 16:
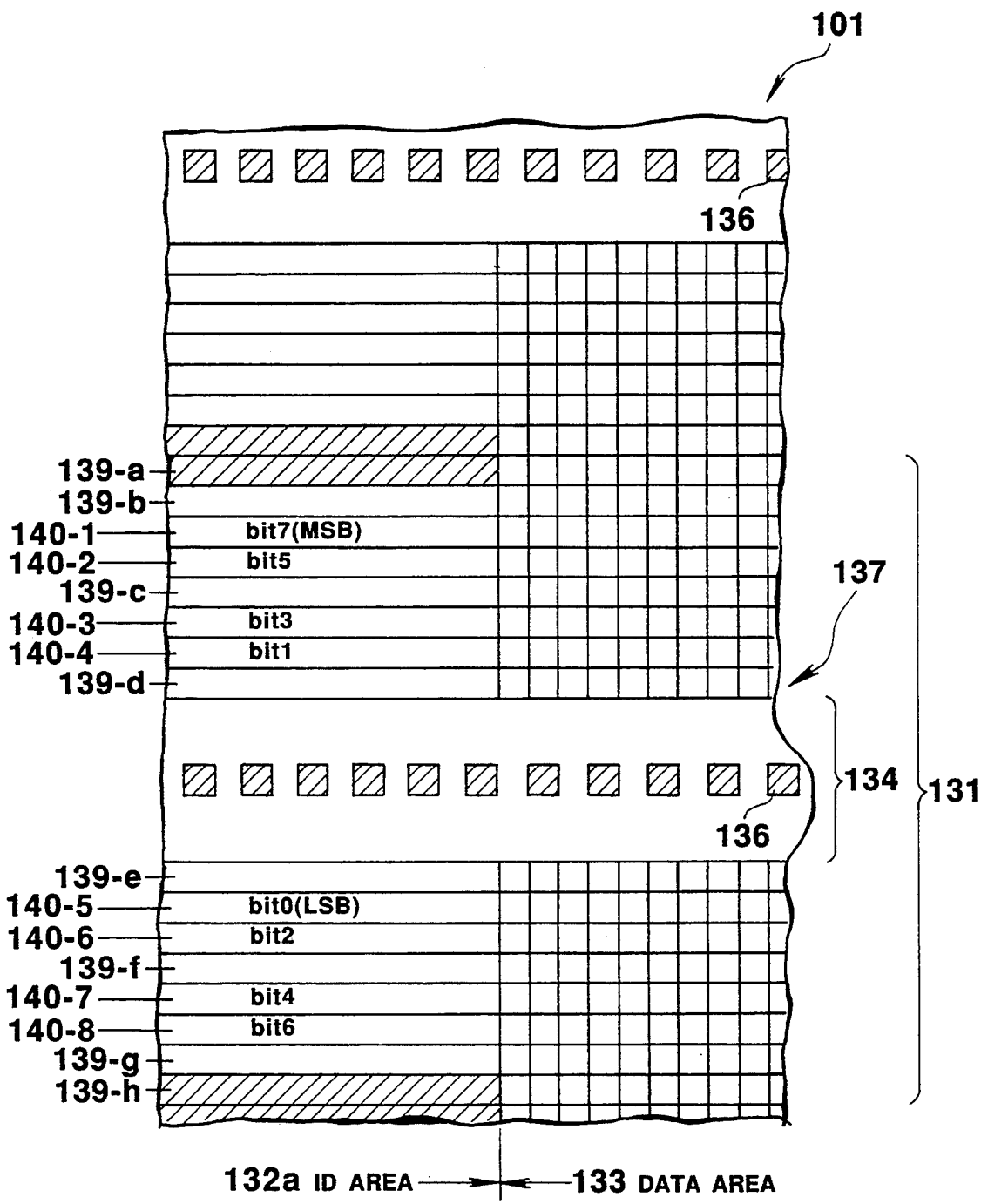
FIG. 16 is a view illustrating the format in an ID area of the optical card.

FIG. 16 shows in detail the track 131 in area A in FIG. 1, which track is surrounded by the dotted line shown in FIG. 1. As described above, in the data area 133, the clock pattern 136 formed of white and black patterns which extend in the direction of the tracks is prerecorded in the clock line area 134. In the data area 133, the recording area 135 for 8-bit data (a total of 16-bit data), is formed at both sides of the clock line area 134 in the direction of the track width. In the ID area 132a, reference numerals 139-a to 139-h each denote a specific recognition pattern common to each track; and reference numerals 140-1 to 140-8 each denote a pattern indicating a track number.

A track number 140 and a recognition pattern 139 in the ID area 132a are detected during the seek operation. During the reproduction operation, 16-bit data in the data area 133 is read out at one time. Thus, the speed of a reading operation is increased. In FIG. 16, the data area 133 on the same line as the area 139-d of the ID area 132a is set to the user recording line 13 7.

Figure 17:
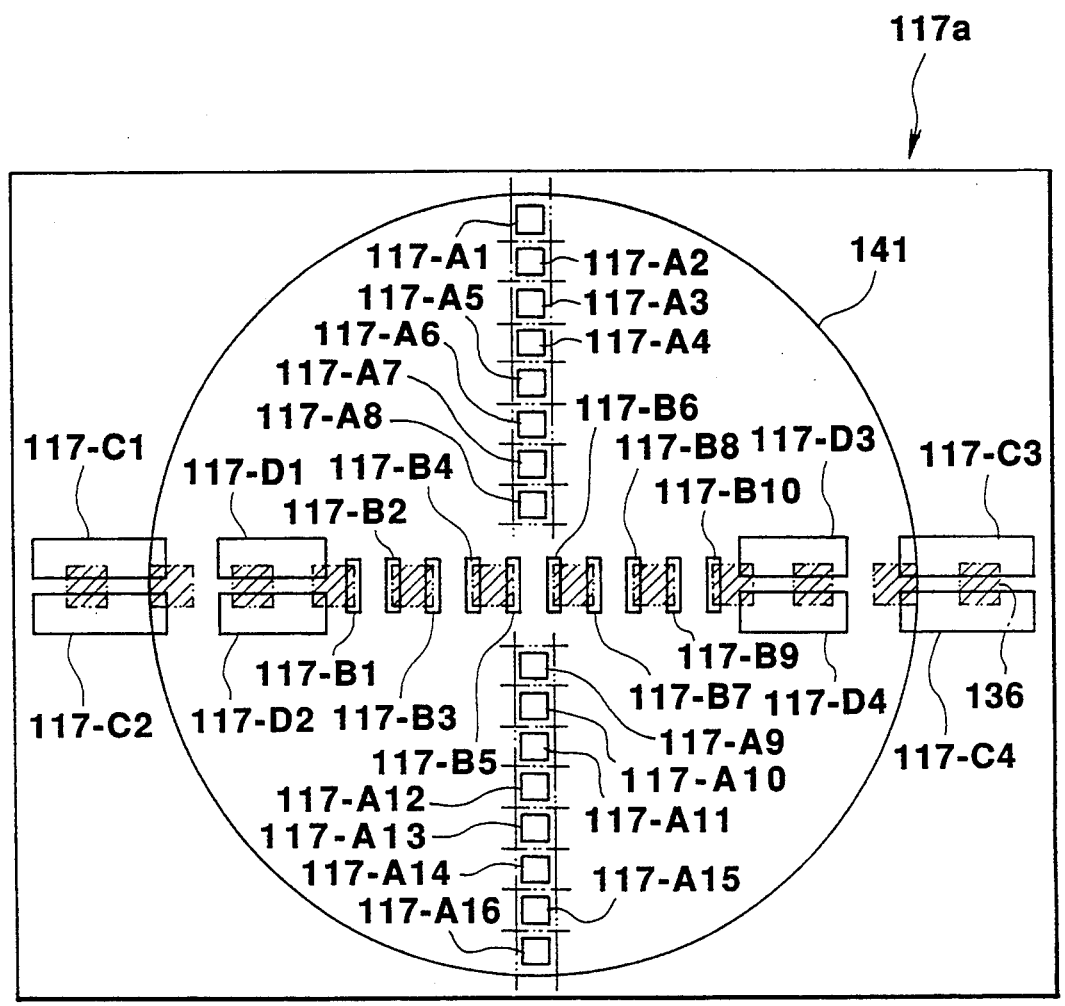
FIG. 17 shows a photodetector.

FIG. 17 shows the photoreceptive surface 117a of the photodetector 117. It is formed of 16 photoreceptive areas 117-A1 to 117-A16 for reading data, arranged in correspondence with the 16-bit data recording positions in the direction of the track width, five pairs of photoreceptive areas 117-B1 to 117-B10 for generating clocks, arranged spaced apart in the direction of the track so as to receive the image of the clock pattern 136, and four pairs of photoreceptive areas 117-C1 to 117-C4 and 117-D1 to 117-D4 for detecting servo signals, arranged spaced apart in the direction of the track width so as to receive the image at both edges of the clock pattern 136 in the direction of the track width. Reference numeral 141 denotes an image in the light-emitting section of the LED 109, formed on the photodetector 117 after being reflected by the optical card 101.

Figure 18:
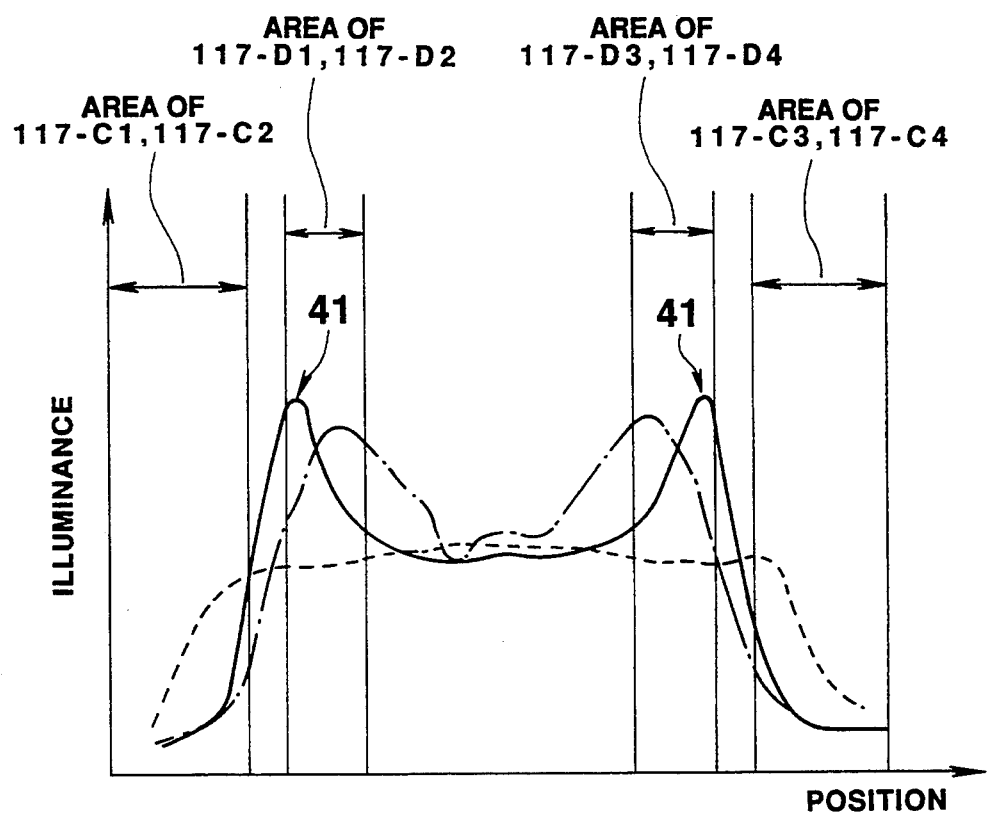
FIG. 18 is a view illustrating the distribution of illuminance in the direction of the diameter of an image of a light emitting section, formed in the photodetector.

The arrangement of the LED 109 and the magnification are set so that a projection surface 141 is formed in the vicinity of the outside of the photoreceptive areas 117-D1, 117-D2, 117-D3 and 117-D4 for detecting servo signals on the inside, as the distribution of illuminance in the direction of the diameter of the image in the light-emitting section, formed in the photodetector 117, is shown by the solid line in FIG. 17 in a condition in which the recording surface of the optical card 101 is brought into the focus position of the object lens 115. With this arrangement, if the optical card 101 is moved nearer than the focus position of the object lens 115, the illuminance distribution on the photodetector 117 is as shown by the broken line in FIG. 18. If, on the contrary, the optical card 101 is moved away from object lens 115, the illuminance distribution is as shown by the a long and short dashed line.

That is, if the optical card 101 approaches the object lens 115, the amount of light incident on the photoreceptive areas 117-C1, 117-C2, 117-C3 and 117-C4 for detecting servo signals on the outside increases, and the amount of light incident on the photoreceptive areas 117-D1, 117-D2, 117-D3 and 117-D4 for detecting servo signals on the inside decreases. On the contrary, if the optical card 101 moves away from the object lens 115, the amount of light incident on the photoreceptive areas 117-C1, 117-C2, 117-C3 and 117-C4 for detecting servo signals on the outside decreases, and the amount of light incident on the photoreceptive areas 117-C1, 117-C2, 117-C3 and 117-C4 for detecting servo signals on the outside increases.

In this way, the focus error signal is obtained on the basis of the difference between the sum of the outputs of the photoreceptive areas 117-C1, 117-C2, 117-C3 and 117-C4 for detecting servo signals on the outside and the sum of the outputs of the photoreceptive areas 117-D1, 117-D2, 117-D3 and 117-D4 on the inside. The tracking error signal is obtained on the basis of the difference between the sum of the outputs of the photoreceptive areas 117-D1, 117-D2, and 117-D3, and the sum of the outputs of the photoreceptive areas 117-D2 and 117-D4.

A clock signal is obtained on the basis of the difference between the sum of the outputs of the photoreceptive areas 117-B1, 117-B3, 117-B5, 117-B7 and 117-B9, which form one half of the pair for generating a clock, and the sum of the outputs of the photoreceptive areas 117-B2, 117-B4, 117-B6, 117-B8 and 117-B10, which form the other half. During reproduction, 16-bit data is read at one time on the basis of the outputs from the photoreceptive areas 117-A1 to 117-A16 for reading data in synchronization with this clock signal. During recording, information is written on the recording surface of the optical card 101 by a light beam from the laser diode 108.

Figure 19:
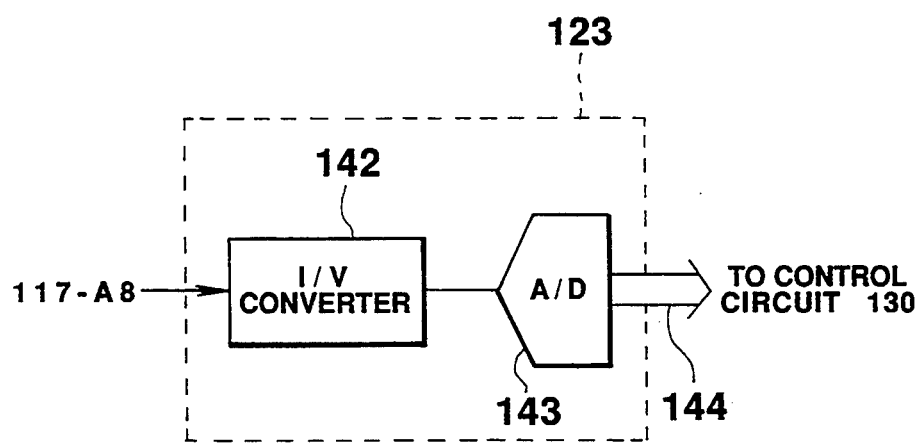
FIG. 19 is a view illustrating some functions of a demodulation circuit during recording.

A detection signal of the photoreceptive area 117-A8 is input to the demodulation circuit 123 during recording, as shown in FIG. 19. After the signal is converted into a voltage by an I-V conversion circuit 142 which forms a part of the demodulation circuit 123, it is converted into a digital value 144 by the A/D converter 143 and outputted to the control circuit 130. During reproduction, detection signals of other photoreceptive areas are input also.

As shown in FIG. 20, in the tracking control circuit 125, detection signals from the photoreceptive areas 117-D1 and 117-D3 for detecting servo signals of the photodetector 117 are input to an addition circuit 146 after the signals are I-1/converted by an I-V conversion circuit 145. Detection signals from the photoreceptive areas 117-D2 and 117-D4 for detecting servo signals are input to an addition circuit 147 after the signals are I-V converted. Regarding each output, a tracking error signal 149 is generated by an differential amplifier 148. The tracking error signal 149 is output to the tracking coil 127 within the optical head 102 after passing through a phase compensation circuit 150, an analog switch 151 and a driving circuit 152. Thus, a tracking servo loop is formed.

Furthermore, the tracking error signal 149 is also input to the mirror control circuit 128 and outputted to the piezoelectric element 129 after passing through a phase compensation circuit 153, an analog switch 154, an addition circuit 155, and a driving circuit 156, thus forming a servo loop. The recording beam is controlled by rotating the mirror 113. An analog value obtained by converting a digital value 157 from the control circuit 130 by a D/A converter 158 is input to the other input terminal of the addition circuit 155. The analog switches 151 and 154 open/close the servo loop by a control signal 159 from the control circuit 130.

Next, the series of recording/reproducing operations will be explained with reference to FIG. 14. First, the optical head 103 is driven to a target track by means of the head motor 105 while focus control is being performed. When the target track is detected, the head motor 105 is stopped and at the same time tracking control is initiated. During the reproduction of information in the target track, information is reproduced by the demodulation circuit 123 in synchronization with the clock signal while the optical card 101 and the optical head 103 are moved relatively in the direction of the track by means of the card motor 104.

During recording on the target track, first the recording beam from the laser diode 108 is positioned on a specific line on a track 101, i.e., the user recording line 137. Under this condition, while tracking control is being performed in the same manner as in the above-described reproduction, light of the laser diode 108 is modulated in synchronization with the clock signal while the optical card 101 and the optical head 103 are moved relatively in the direction of the track by means of the card motor 104, and information is recorded on the recording surface of the optical card 101.

A method of positioning the recording beam in the above case will be explained below. In this embodiment, the target track of the recording beam is determined at the position of the optical card 101 corresponding to the photoreceptive area 117-A8 for reading data of the photoreceptive surface 117a of the photodetector 117 shown in FIG. 17. As shown in FIG. 19, regarding a part of the demodulation circuit 123, after detection signals from the photoreceptive area 117-A8 for reading data of the photoreceptive surface 117a of the photodetector 117 are converted into a voltage by the I-V conversion circuit 142, the signals are converted into the digital value 144 by the A/D converter 143 and outputted to the control circuit 130.

Detection signals of the photoreceptive areas 117-D1 to 117-D4 for detecting servo signals are input to the tracking control circuit 125, as shown in FIG. 20, and the tracking error signal 149 is generated. A signal based on this tracking error signal 149 is supplied to the tracking coil 127, and a tracking servo loop is formed. As described above, the tracking error signal 149 is also input to the mirror control circuit 128. The mirror 113 is rotated by means of the piezoelectric element 129, and thus the position of the recording beam is controlled.

Next, the operation for positioning the recording beam on the user recording line 137 and performing recording will be explained in detail. It is assumed that the object lens 115 within the optical head 103 is positioned in the center of the clock pattern 136 on the target track. Under this condition:

(1) With the output of the laser diode 108 being set to such a low output that writing is impossible, a fine recording beam (indicated by L1 in FIG. 21) is projected onto the optical card 101.

Figure 21:
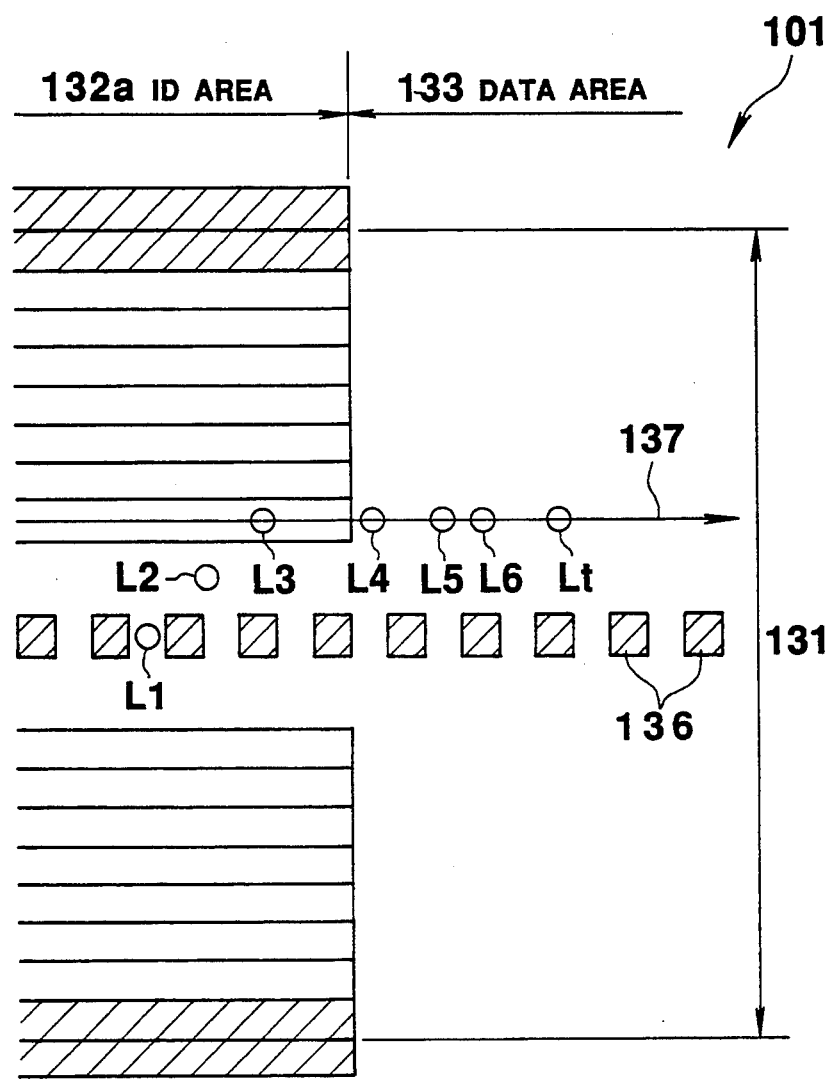

(2) The recording beam is displaced to the user recording line 137 as L1→to L2→L3 in FIG. 21 by causing the mirror 113 to rotate as a result of increasing (or decreasing) the digital value 157 (corresponding to a variable amount) by the control circuit 130. The control circuit 130 continues to monitor the digital value 144 (corresponding to a monitor amount) of the A/D converter 143 and determines the maximum value of the digital value 144.

(3) As a result of causing the recording beam to be displaced in the above-described way, there exists a position at which the monitor amount 144 is determined to be a maximum. The detection signal from the photoreceptive area 117-A8 for reading data of the photodetector 117 becomes a maximum, and the recording beam is positioned on the recording line (the position of beam L3 in FIG. 21 corresponds to this condition).

(4) The control circuit 130 retains the displacement amount 157 when the recording beam is positioned, and stops the output from the laser diode 108.

(5) While the optical card 101 and the optical head 103 are moved relatively in the direction of the track, the boundary between the ID area 132a and the data area 133 is detected. When the optical head 103 enters the data area 133, the output of the laser diode 108 is set to such a high output that writing is possible in synchronization with the clock signal. The recording beam is sequentially projected onto the optical card 101 as L4→L5→L6→ Lt in FIG. 21, thus forming pits.

In this way, for example, tracking control is performed in such a way that the displacement amount 157 is given in order to displace the light beam by the distance between the initial irradiation position of the recording beam (the clock pattern 136 in this case) and the user recording line 137, and the position of the object lens 115 of the optical head 103 is variably controlled by a tracking error signal during movement so that the irradiation central position of the LED 109 traces the clock pattern 136. As a consequence, the position of irradiation by the laser diode 108 is away from the clock pattern 136 a fixed distance, i.e., is controlled to move on the user recording line 137. Thus, information can be recorded on the user recording line 137.

Figure 23:
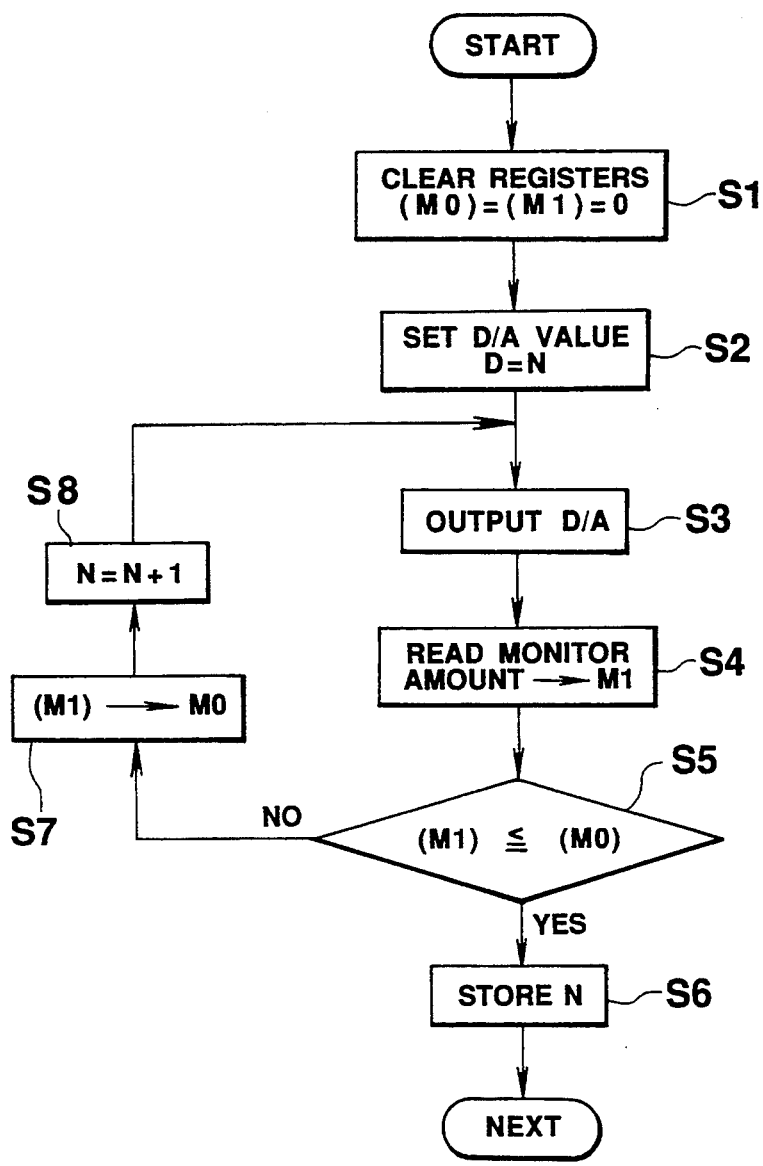
FIG. 23 is a flowchart illustrating a sequence for positioning of a recording beam.

The circumstance in which the recording beam L1 is set at the specific user recording line 137 will be explained below in more detail with reference to FIG. 22 and the flowchart of FIG. 23.

In a condition in which the recording beam is in an initial position (it is assumed that it is on the center position of the clock pattern 136), as shown in FIG. 22(a), the control circuit 130 increases (or decreases) the displacement amount 157 so as to cause the recording beam to move to the user recording line 137. At that time, the control circuit 130 monitors the amount of light received by the photoreceptive area 117-A8 shown in FIG. 17 for reading data which receives reflected light on the user recording line 137 in the direction of the track width, by means of the A/D converter 143 shown in FIG. 19.

The monitor amount, shown in FIG. 22(b), increases as the recording beam is moved, in proportional to an increase in the area where the recording beam exists within the photoreceptive area 117-A8, becomes a maximum amount in a condition in which the recording beam exists in the photoreceptive area 117-A8. When the recording beam is moved further, the monitor amount decreases, and decreases to the level of the light amount of the LED 109 if it is moved out of the photoreceptive area 117-A8. FIG. 23 is a flowchart illustrating the operations for causing the recording beam to move, and for retaining the D/A value at which the monitor amount is a maximum values.

In this case, in step S1, the control circuit 130 clears the registers within the control circuit 130, so that two variables M0 and M1 for retaining the monitor amounts are set at 0.

In the subsequent step S2, after the D/A value is set at, for example, N (smaller than the value for causing the recording beam to move from the clock pattern 136 to the user recording line 137), the D/A value is output in step S3. The recording beam is moved in response to this output.

At this time, the monitor amount is read in step S4, and this value is designated as M1. In step S5, the value M1 is compared with the previous value (the initial value 0 in this case), that is, whether $M1 \geq M0$ is checked so as to determine whether the read value is a maximum value. When it is a maximum value, the D/A value at that time, i.e., N, is retained in step S6.

If, however, it is not a maximum value, the read value M1 is set at M0 in step S7. In the subsequent step S8, the D/A value is incremented by 1 ($N \rightarrow N+1$), and the process returns to step S3. The D/A value when the monitor amount becomes a maximum value is retained, and the position of the recording beam is maintained as it is. Thus, the recording beam is positioned on the user recording line 137.

The center of the photoreceptive area 117-A8 need not to be strictly aligned with the center of the recording beam as the photoreceptive area 117-A8 is made larger than the diameter of the recording beam. That is, positioning can be performed easily. In this way, information can be recorded on the user recording line 137 to which it has been positioned. When information is recorded on the user recording line 137 of other tracks, the recording beam can be positioned on the user recording line 137 by merely giving the displacement amount 157 (the D/A value) retained by the control circuit 130 and turning on the control signal 159.

According to this optical card 101, positioning of a recording beam can be realized with a simple circuit arrangement since one line of each track formed of a plurality of lines is set as a recording line and ancillary information of other reproduction-only information areas can be written. An optical card which is capable of reading noticed information in a short time can be provided. In addition, since information can be added (written) later, it is suitable for applications wider than those of a reproduction-only case, and more effective for reading noticed information in a shorter time than a case in which recording areas are provided in units of tracks.

On the other hand, according to the optical head 102, positioning means is provided for positioning a recording light beam only on a specific recording line of a plurality of recording lines. If positioning of the recording beam from the reference position (e.g., the clock pattern 136) to the recording line is performed one time by the positioning means (to be specific, the setting of the displacement amount 157), the recording beam can be positioned on the recording line as well as on other tracks by merely giving an amount corresponding to the positioning (e.g., the displacement amount 157). Thus, an apparatus capable of recording with a simple circuit arrangement and control system can be realized.

In addition, since ancillary information for reproduction-only information can be written in the same track, noticed information including the ancillary information can be read out in a shorter time than a case in which recording areas are provided on each track.

In applications mainly for reproduction-only, recording/reproducing tracks or reproduction-only tracks can be set as desired. As information from a plurality of lines can be read at one time during the reproduction operation, information can be reproduced efficiently.

Although in the above-described explanation, the initial irradiation position of a recording beam is set at the clock pattern 136, it may be set at other positions. To set the initial irradiation position at the clock pattern 136, for example, the central position of the wide-area illumination of the LED 109 is set at the clock pattern 136, then the LED 109 is extinguished. A defocusing signal is applied to the focus coil 126. Beams in a defocused condition are irradiated by the laser diode 108 in such a manner as to cover a plurality of lines. The rotational angle of the mirror 113 is controlled to set the position so that the differential outputs of the photoreceptive areas 117-A8 and 117-A9, and/or the differential outputs of the photoreceptive areas 117-A7 and 117-A10, become minimum values.

Although the recording beam can be set on the guide pattern position in the direction of the track width under this control, a case sometimes occurs in which, for example, the recording beam deviates in the direction of the track from the center of the wide-area illumination in FIG. 16. To prevent this, the spot diameter of the laser beam is increased by defocus control, and in this condition control is performed so that the differential outputs of the photoreceptive areas 117-B5 and 117-B6, and/or the differential outputs of the photoreceptive areas 117-B4 and 117-B7, become minimum values.

Although the user recording line 137 is set on a position corresponding to the photoreceptive area 117-A8 for reading data of the photodetector 117, it may be set on another specific line. The present invention is not limited to a case in which one recording line is provided in each of the tracks, but a plurality of recording lines may be provided in each of the tracks. The present invention is also not limited to a case in which one or plural recording lines are provided in each of the tracks, but a track with no recording line may be provided depending upon the application. In addition, a track formed of only recording lines may be formed depending upon the application.

Although an example in which, when a variable amount for positioning on the user recording line 137 is set one time, positioning is performed by using the variable amount used for the setting of the second and subsequent times has been explained, the variable amount may be set at each time, or set when desired, or set each time the optical card 101 is replaced. In addition, positioning may be performed by using a fixed value without setting the variable amount. Or, the variable amount may be set according to the type of the optical card 101, or a fixed value may be selectively set.

Although, in FIG. 14, control is performed so that the light beam of the laser diode 108 is reflected by the mirror 113 and irradiated onto a specific recording line 137 or the like, the present invention is not limited to this example, but the laser diode 108 may be disposed, for example, at a position adjacent to the LED 109. In this case, when the center of the wide-area illumination by the LED 109 matches the clock pattern 136, the laser diode 108 may be mounted so that the beam spot position of the laser diode 108 can be positioned near the specific recording line 137 and thus the beam spot can be positioned on the specific recording line 137 by finely adjusting a screw or the like.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included with the spirit and scope of the claims. The following claims are to be accorded a broad interpretation, so as to encompass all such modifications and equivalent structures and functions.

What is claimed is:

1. An optical card, comprising:
   tracks, formed parallel to each other, having a plurality of information lines; and
   an ID area portion, formed in each of said tracks being divided, in which ID information for identifying each track is recorded, a data area portion, formed in each of said tracks other than said ID area portion, for optically recording data, and a guide pattern portion, formed adjacent to said ID area portion in a direction of a track width, in which guide information for positioning on an arbitrary information line of said plurality of information lines is formed, wherein said guide pattern portion is a pattern structure in which a light reflection factor periodically changes in the direction of said track width.

2. An optical card according to claim 1, wherein a track center pattern indicating the center of each track is formed in the center of the track width in each of said tracks.

3. An optical card according to claim 2, wherein said track center pattern has a synchronization information function for synchronization with a clock signal when information recorded in the track direction, in which each track is extended, is reproduced or recorded.

4. An optical card according to claim 1, wherein an ID pattern different for each track, which forms said ID information, a track recognition pattern used for positioning on each track, common to each track, are formed in the direction of the track width perpendicular to the track direction in which each track is extended.

5. An optical card according to claim 1, wherein said ID area portion is formed in the vicinity of each of the ends of said optical card in the track direction in which each track is extended, and wherein said guide pattern portion is formed adjacent to said ID area portion formed in the vicinity of at least one of the ends thereof.

6. An optical card according to claim 5, wherein said guide pattern portion is formed adjacent to said ID information and on the side of the end portion of said optical card.

7. An optical card according to claim 1, wherein said ID area portion is formed in the vicinity of each of the ends thereof in the track direction in which each track is extended and is formed at the substantially central portion of these ends, and said guide pattern portion is formed adjacent to at least one of three ID area portion.

8. An optical card according to claim 1, wherein said guide pattern portion is formed over all tracks in the direction of the track width perpendicular to the track direction in which each track is extended.

9. An optical card according to claim 7, wherein said guide pattern portion is a portion with pattern which has high and low reflectance lines being repeated at a cycle of two lines in said plurality of information lines.

10. An optical card according to claim 1, wherein said guide pattern portion has a length larger than the width of one track and is formed in the track direction in which each track is extended.

11. An optical card according to claim 1, wherein each of said tracks has 16 information lines.

12. An optical card according to claim 1, wherein only one specific recording line is provided in a user recording line in which a user can record information.

13. An optical card, comprising:
    tracks, formed parallel to each other, having a plurality of information lines; and
    an ID area portion, formed in each of said tracks being divided, in which ID information for identifying each track is recorded;
    a data area portion, formed in each of said tracks other than said ID area portion, for optically recording data; and
    a guide pattern portion formed in each of said tracks, adjacent to said ID area portion in a direction of a track width, in which guide information for positioning on an arbitrary information line of said plurality of information lines is formed in such a manner as to extend in the direction of the track width perpendicular to the track direction in which each track is extended, wherein said guide pattern portion is a pattern structure in which a light reflection factor periodically changes in the direction of said track width.

* * * * *